FUNCTION GENERATOR FOR ANALOG COMPUTER SYSTEMS
Filed April 3, 1957 23 Sheets-Sheet 1
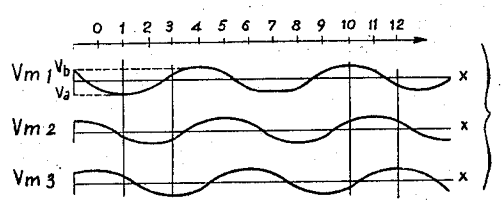
FIG. I-2
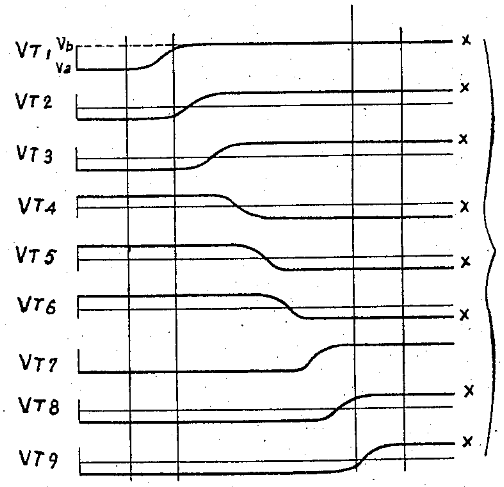
FIG. I-3
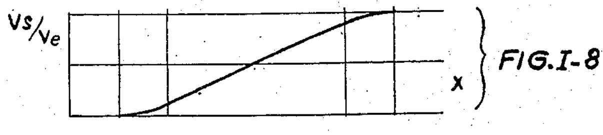
FIG. I-8
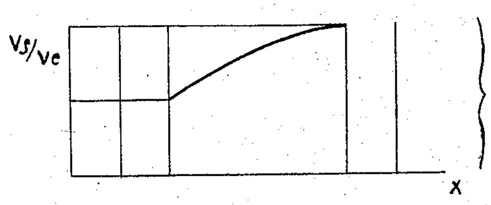
FIG. I-9
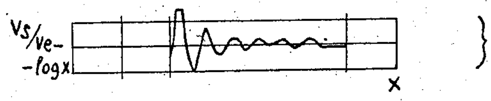
FIG. I-10

FUNCTION GENERATOR FOR ANALOG COMPUTER SYSTEMS
Filed April 3, 1957 23 Sheets-Sheet 2
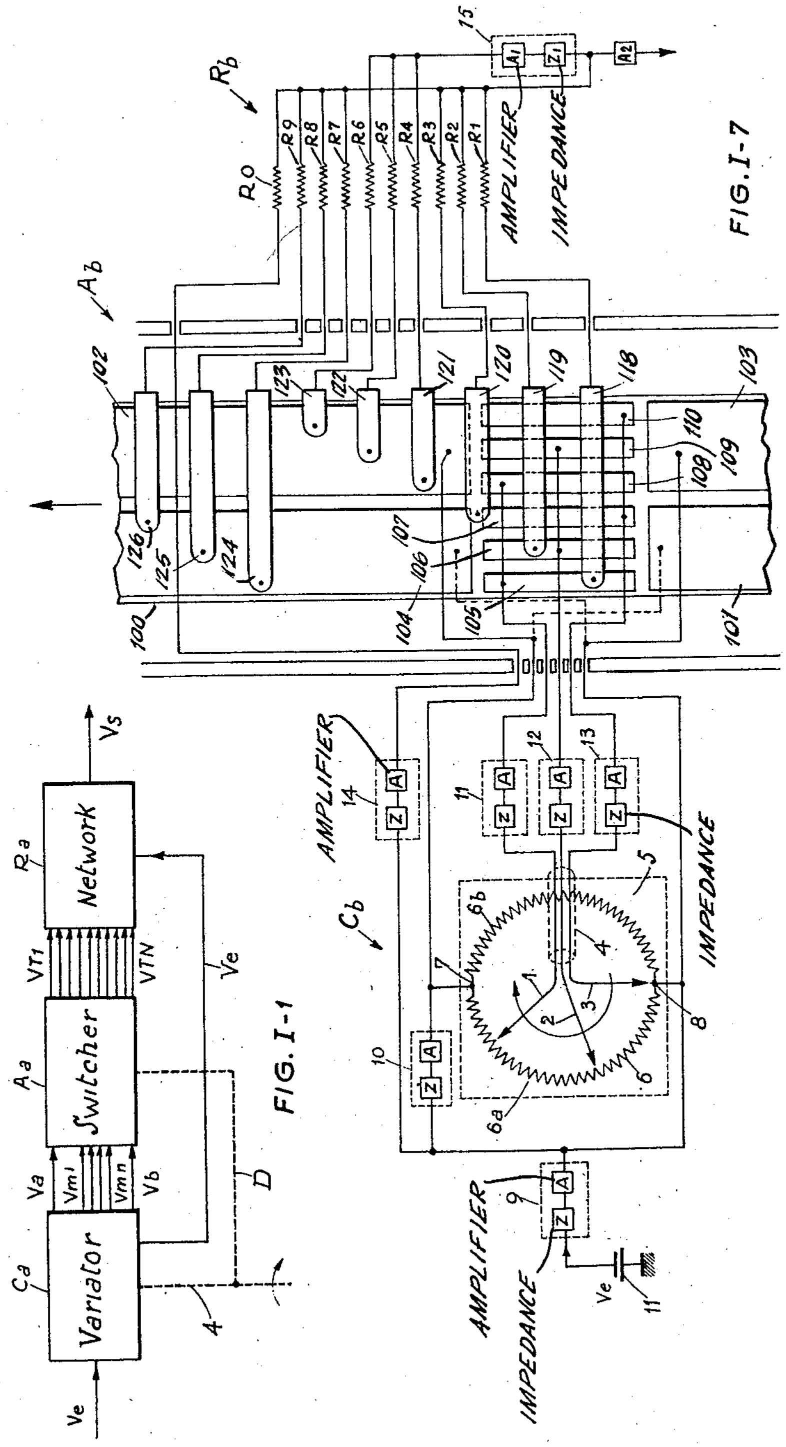
FIG. I-1, FIG. I-7

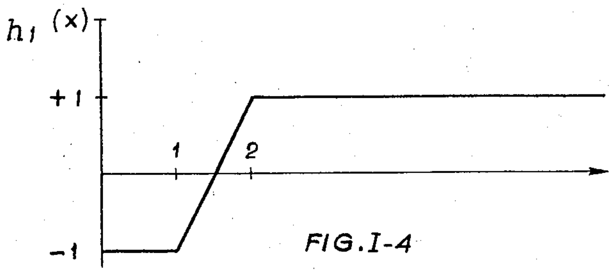
FIG. I-4
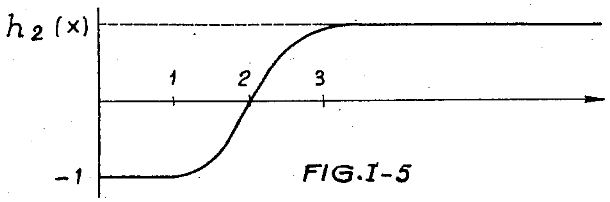
FIG. I-5
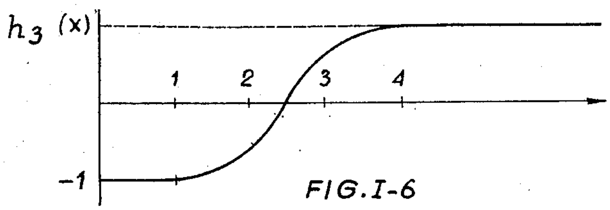
FIG. I-6
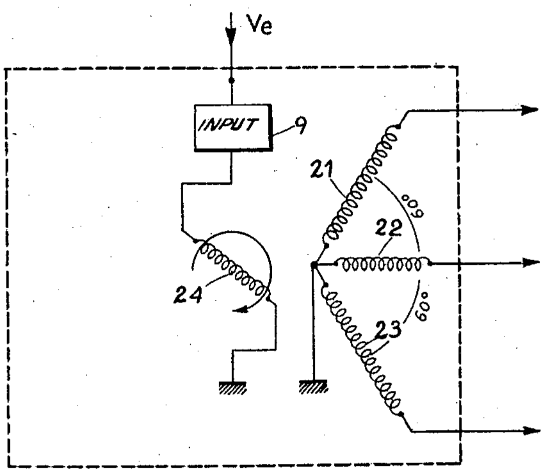
FIG. I-25

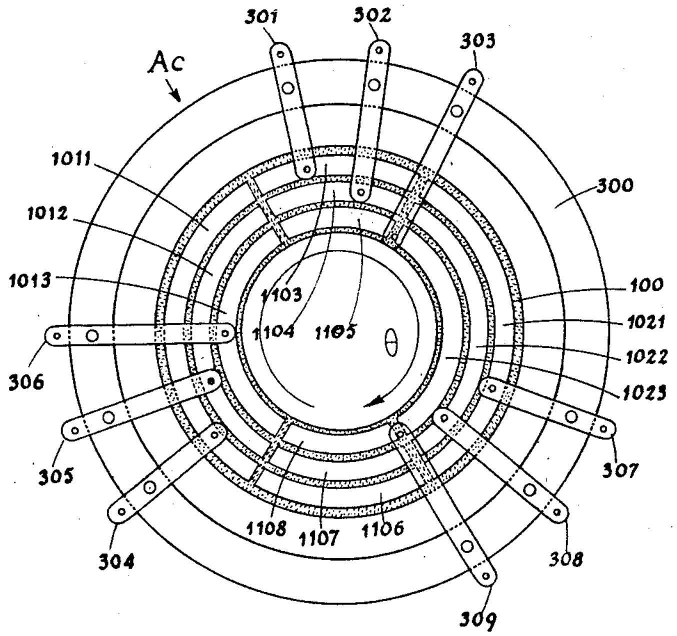
FIG. I-11

FIG. I-12
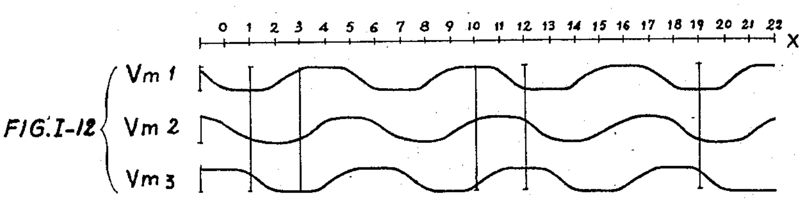
FIG. I-13
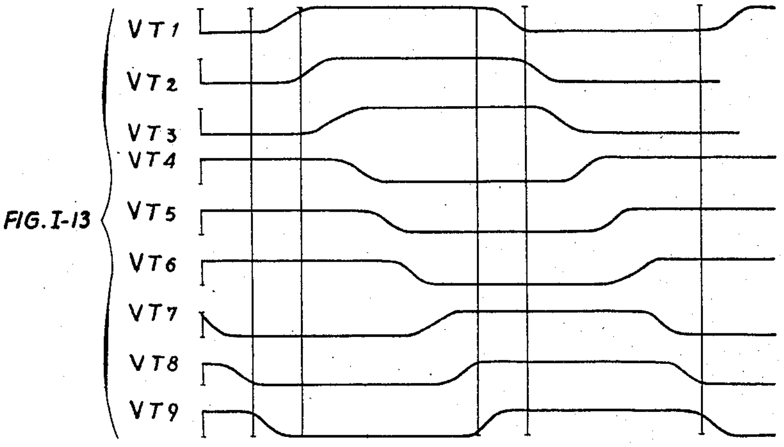
FIG. I-14
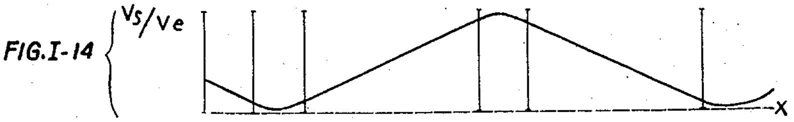
FIG. I-15
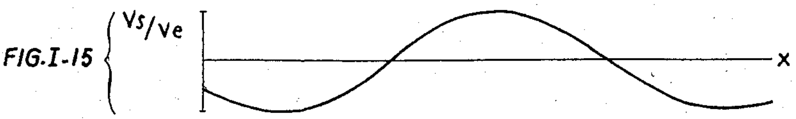
FIG. I-16
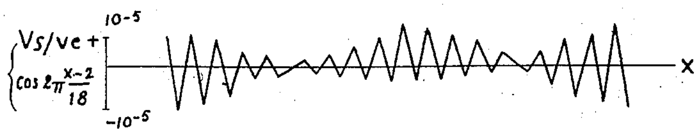

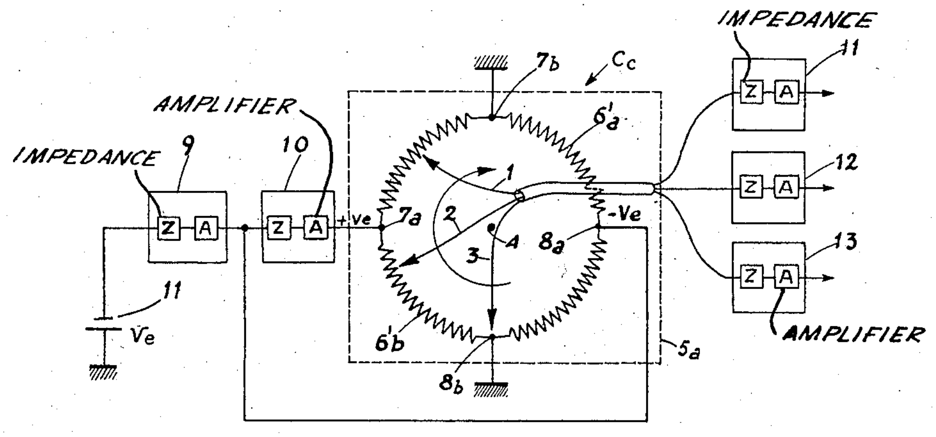
FIG. I-17
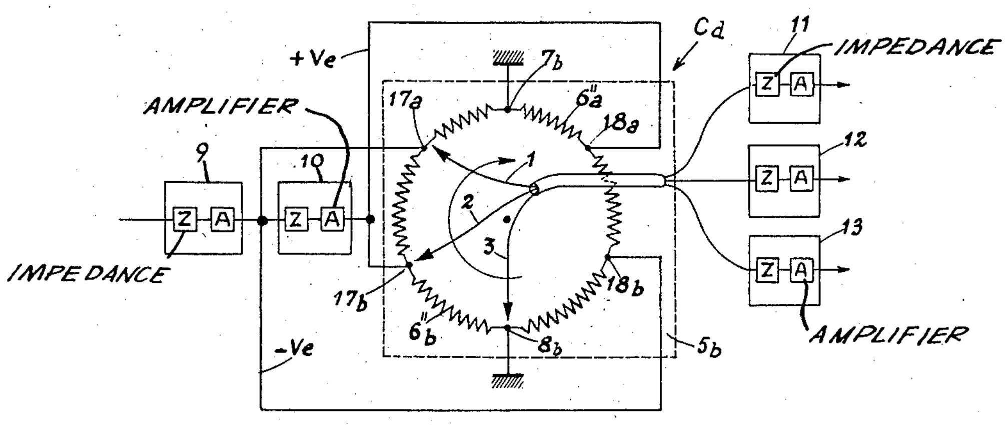
FIG. I-20

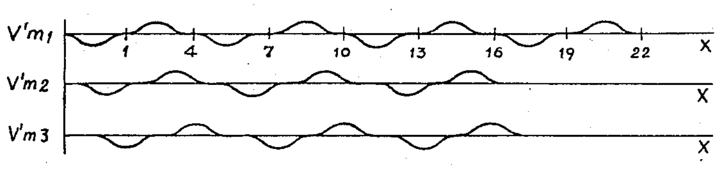
FIG. I-18
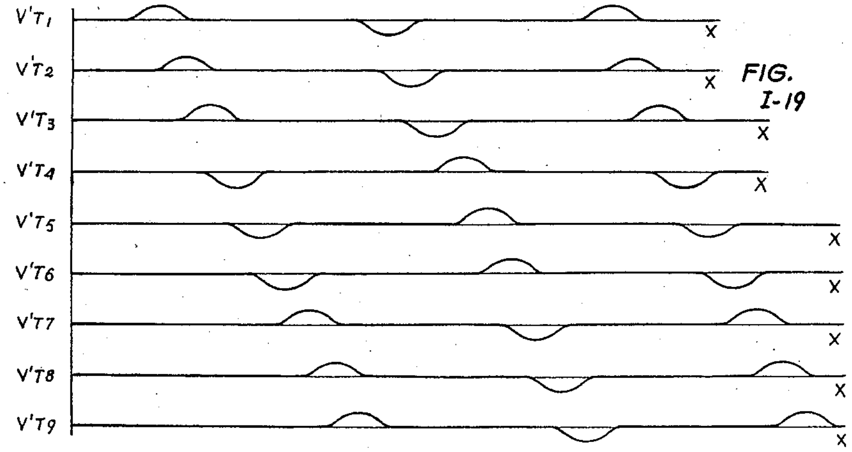
FIG. I-19
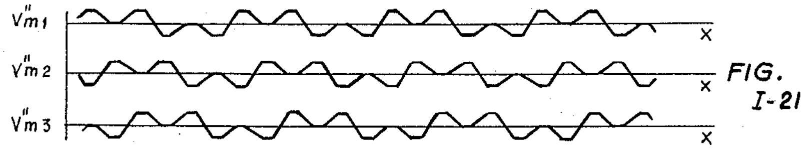
FIG. I-21
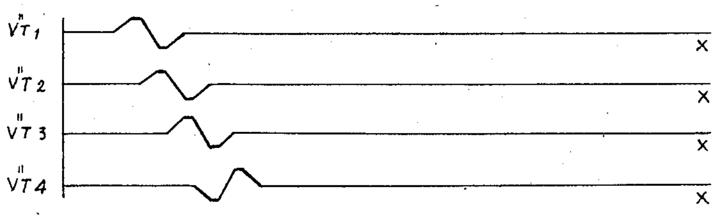
FIG. I-22

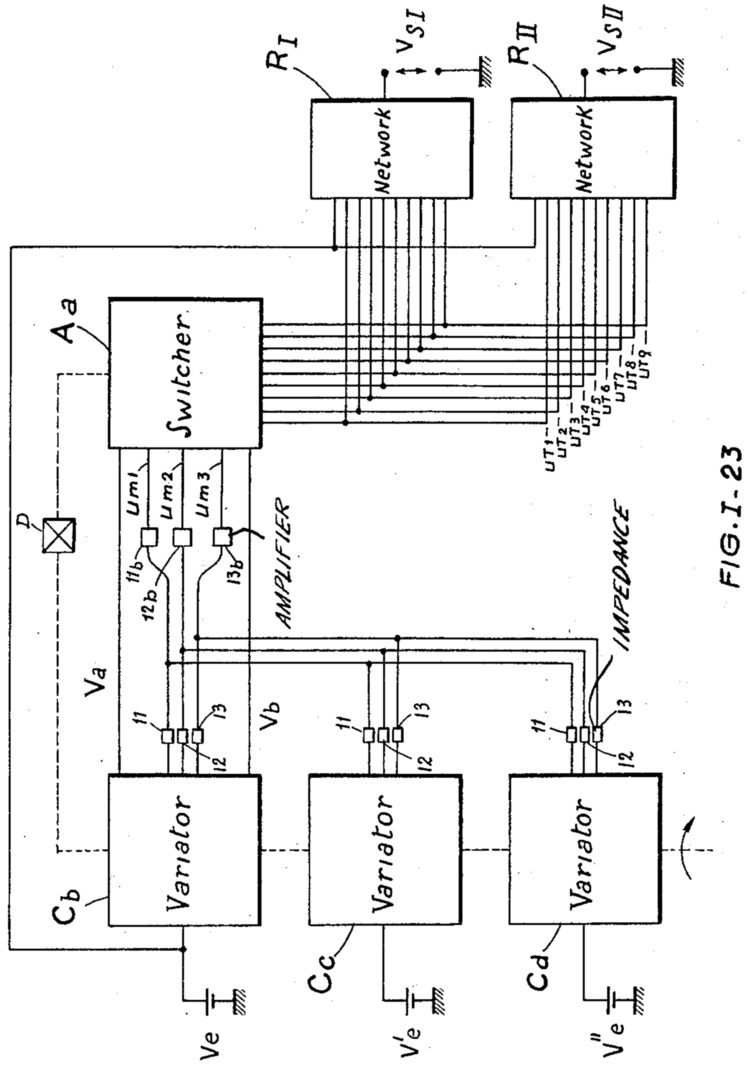
FIG. I-23

Nov. 24, 1959 E. HONORÉ ET AL 2,914,250
FUNCTION GENERATOR FOR ANALOG COMPUTER SYSTEMS
Filed April 3, 1957 23 Sheets-Sheet 9
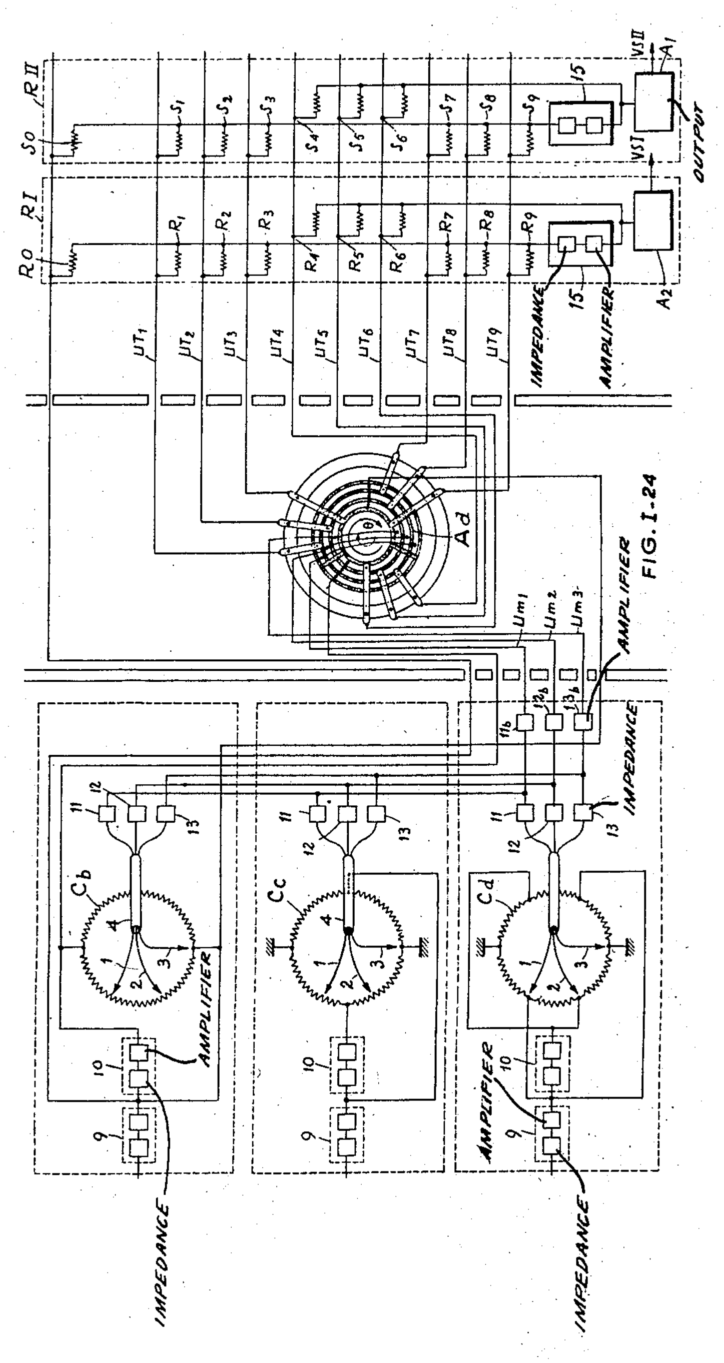
FIG. I-24

Nov. 24, 1959 E. HONORÉ ET AL 2,914,250
FUNCTION GENERATOR FOR ANALOG COMPUTER SYSTEMS
Filed April 3, 1957 23 Sheets-Sheet 10
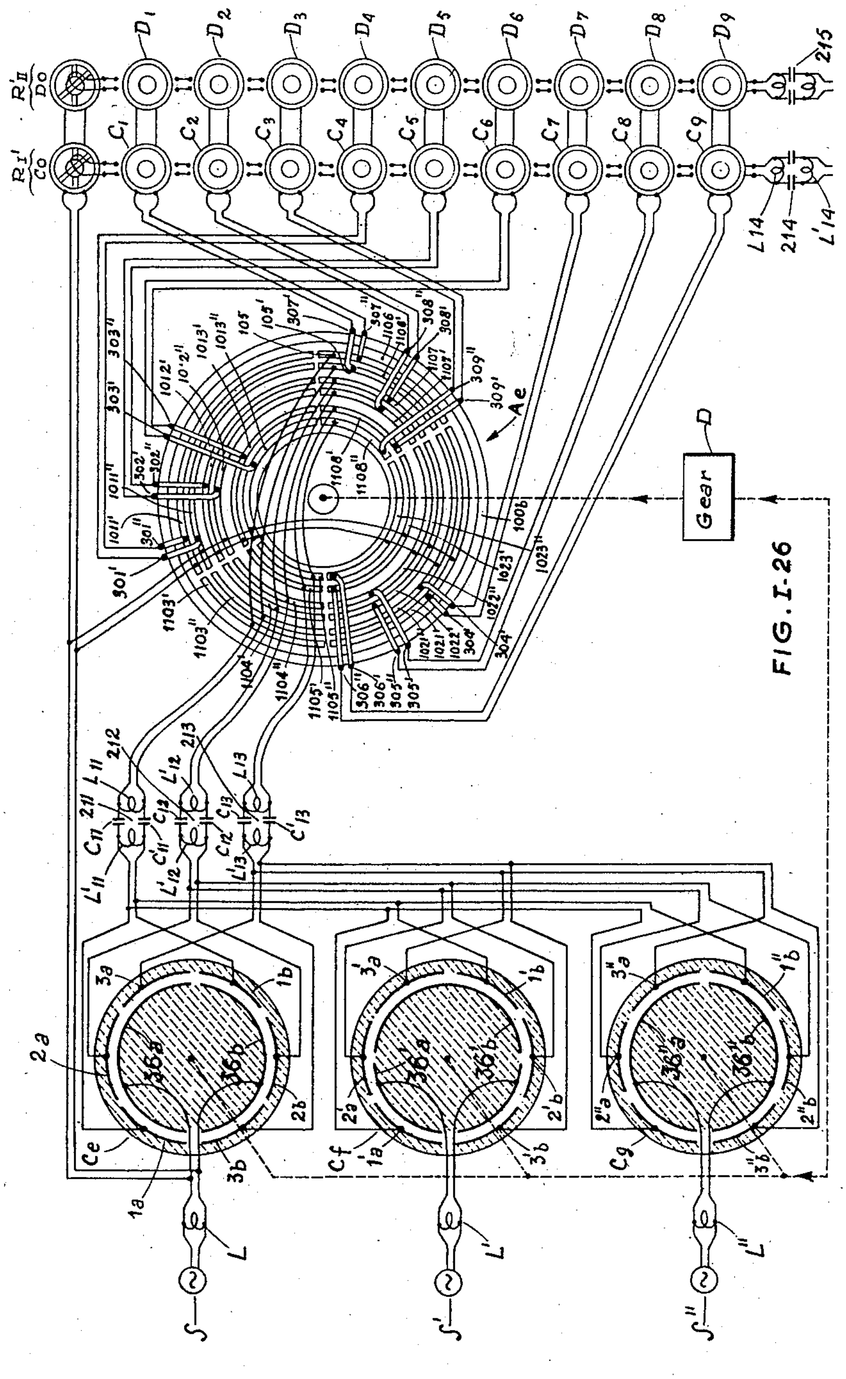
FIG. I-26

Nov. 24, 1959 E. HONORÉ ET AL 2,914,250
FUNCTION GENERATOR FOR ANALOG COMPUTER SYSTEMS
Filed April 3, 1957 23 Sheets-Sheet 11
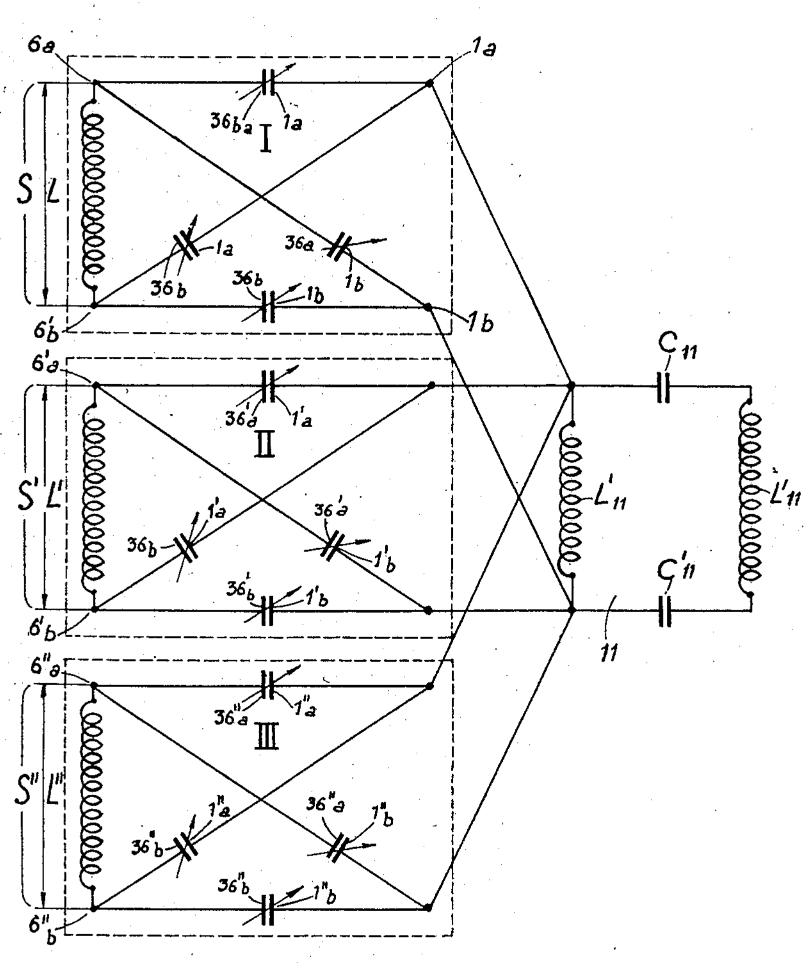
FIG. I-27

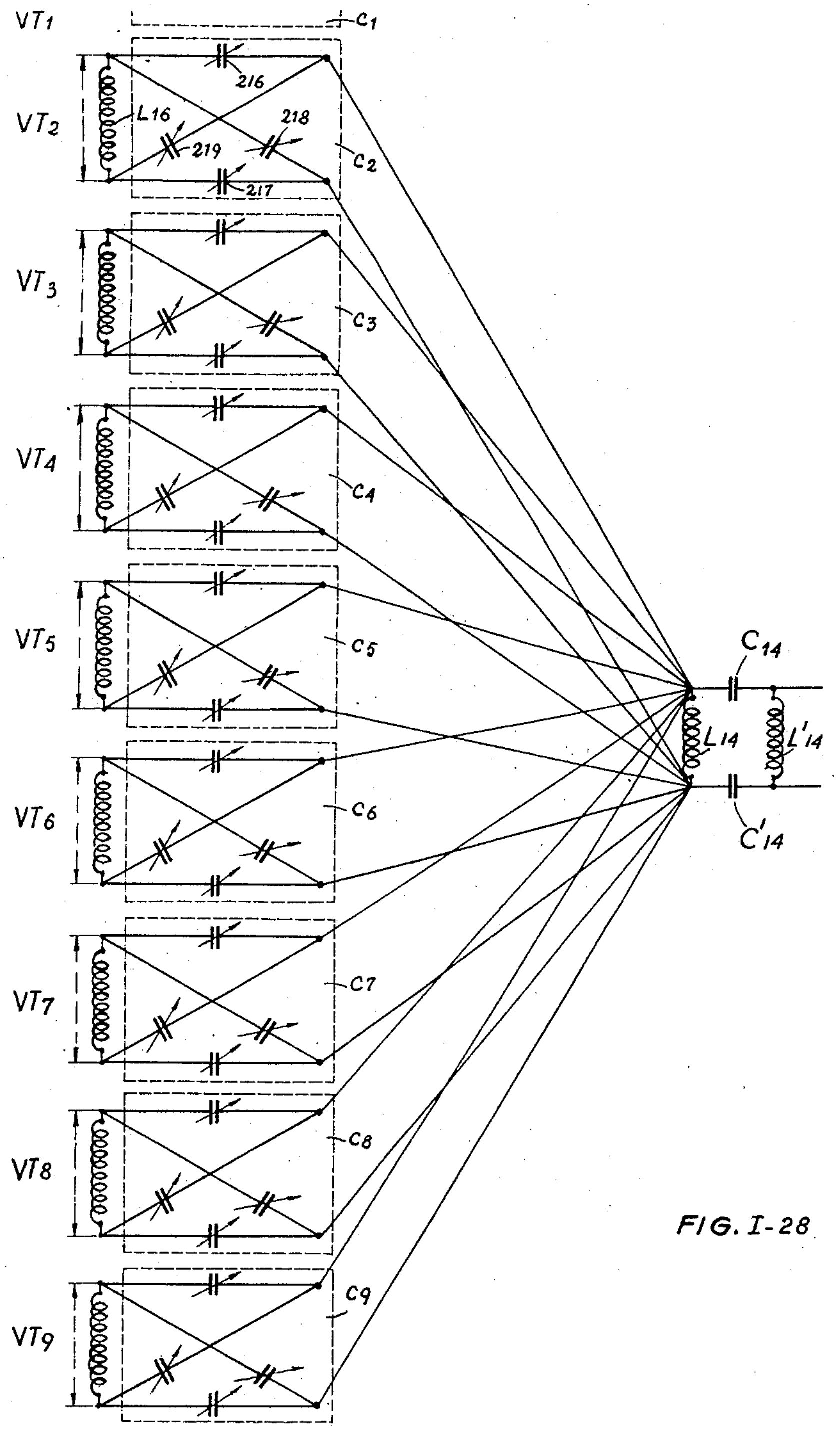
FIG. I-28

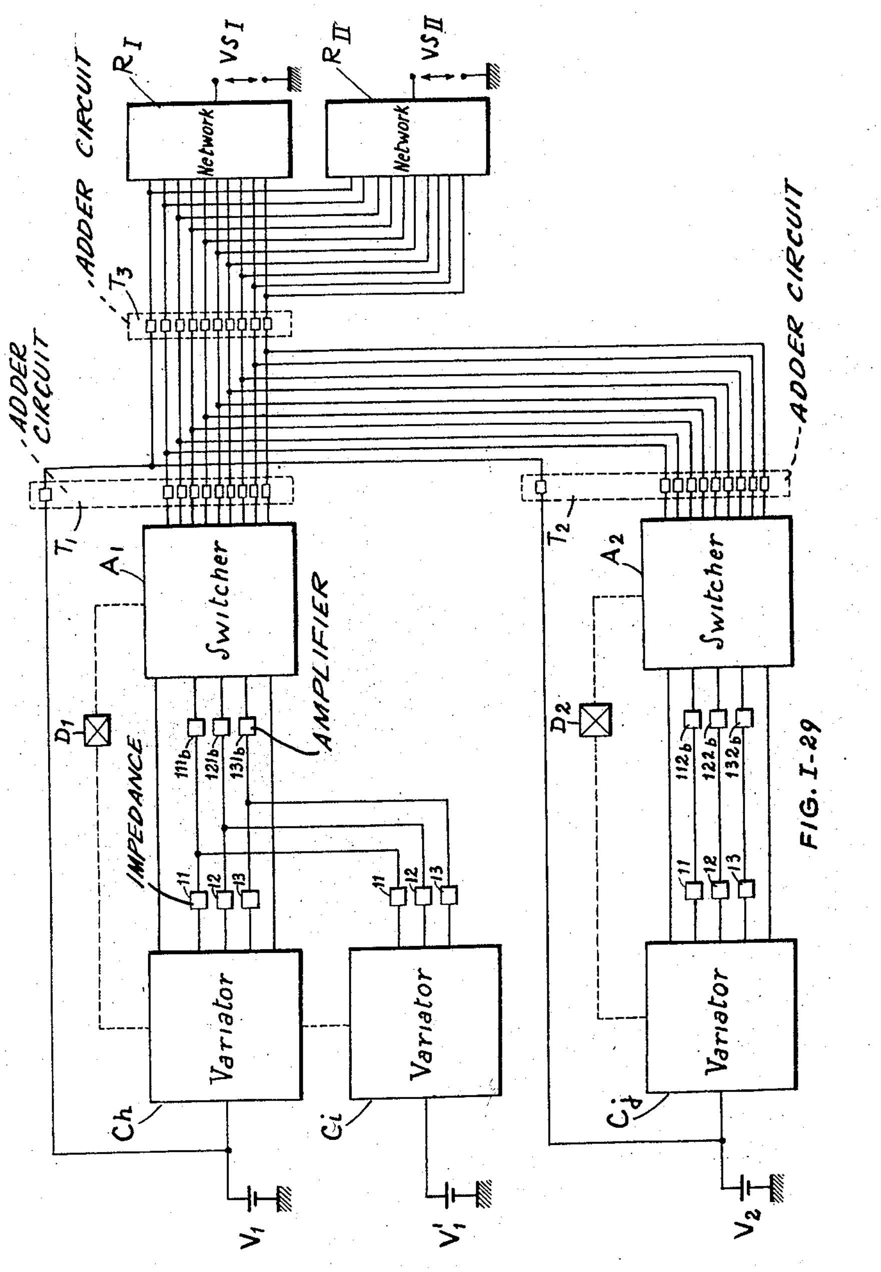
FIG. I-29

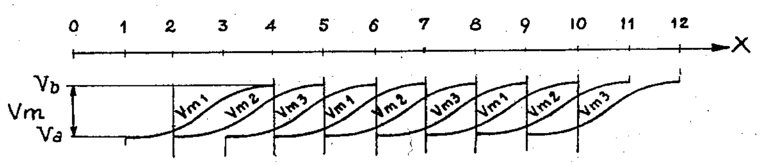
FIG. II.1
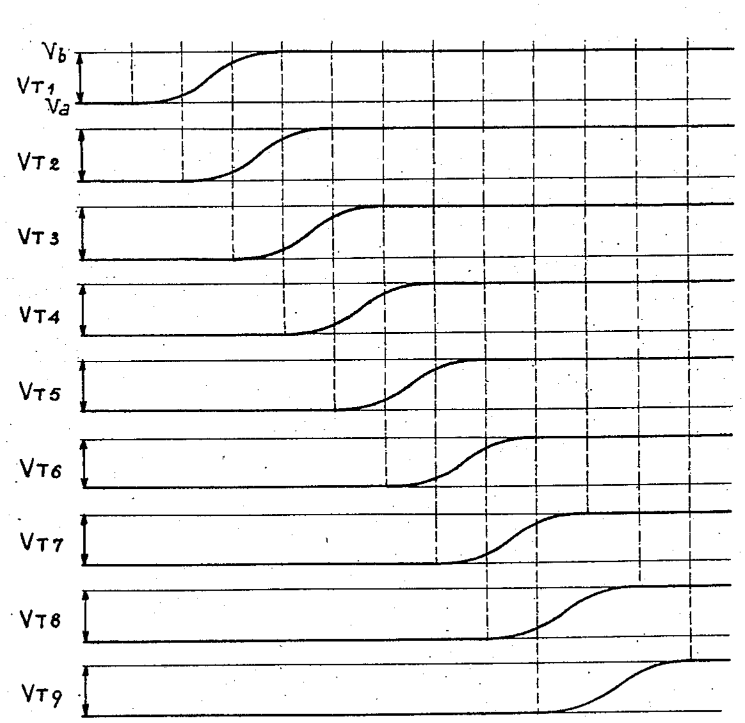
FIG. II.2

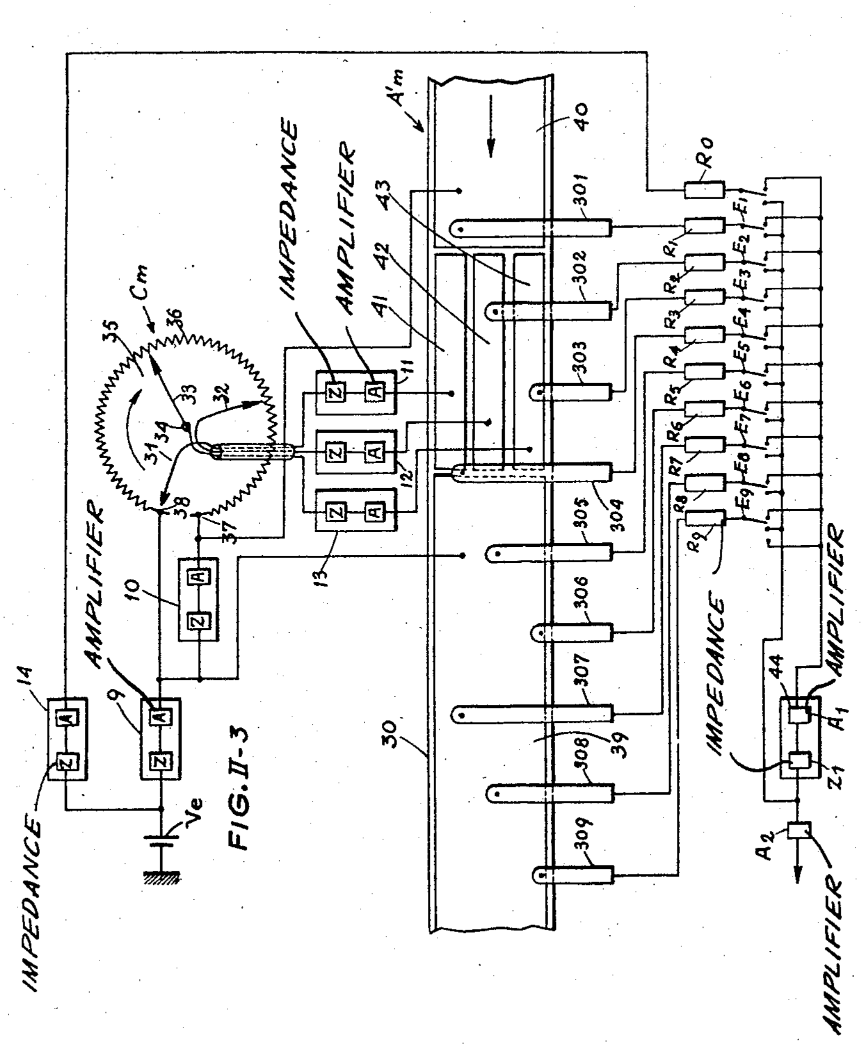
FIG. II-3

FIG. II-5
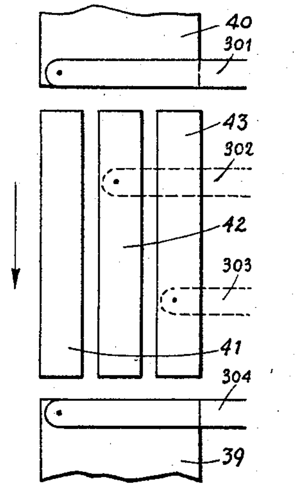
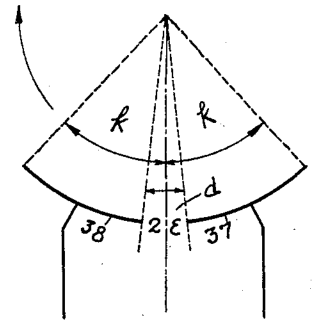
FIG. II-4
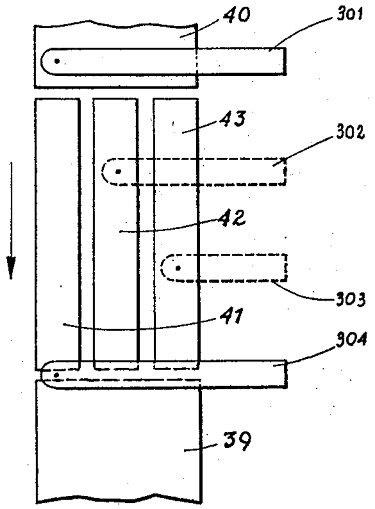
FIG. II-6

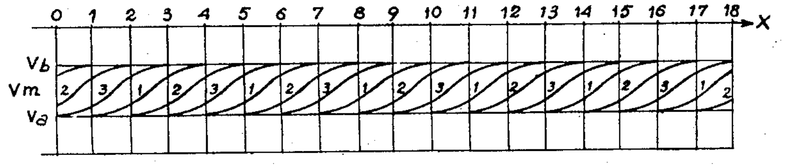
FIG. II-7
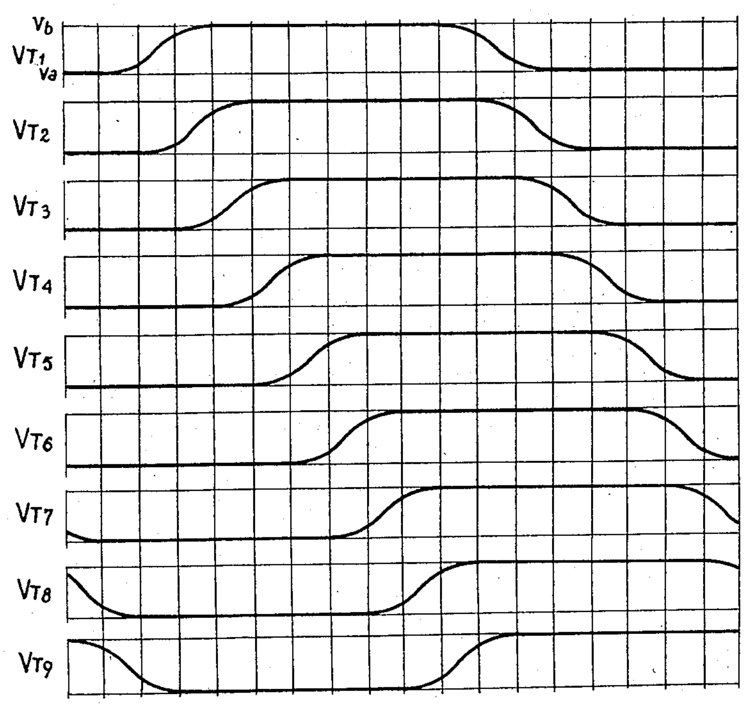
FIG. II-8

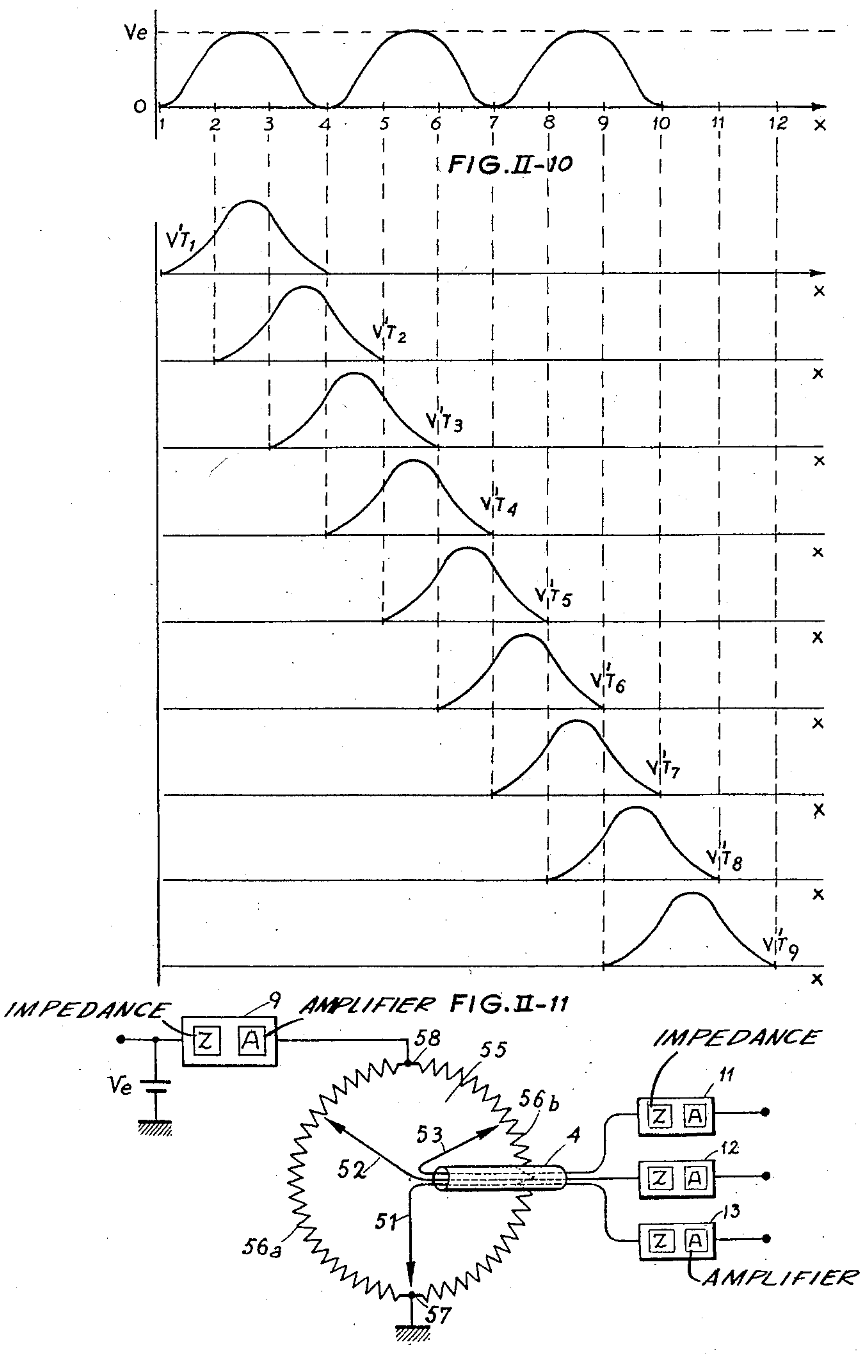
FIG. II-10, FIG. II-11, FIG. II-9

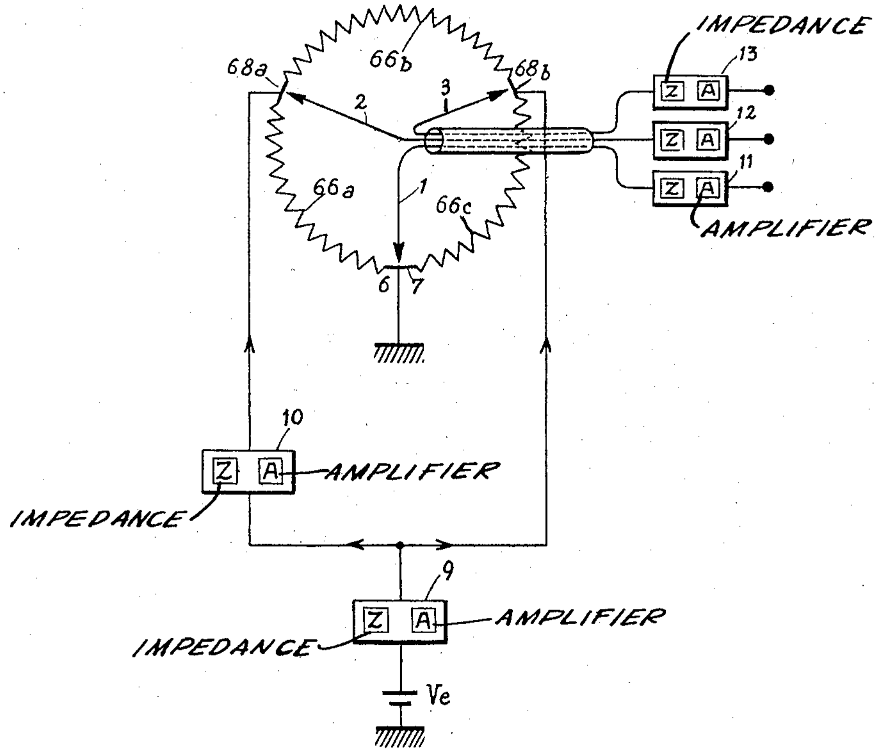
FIG. II-12
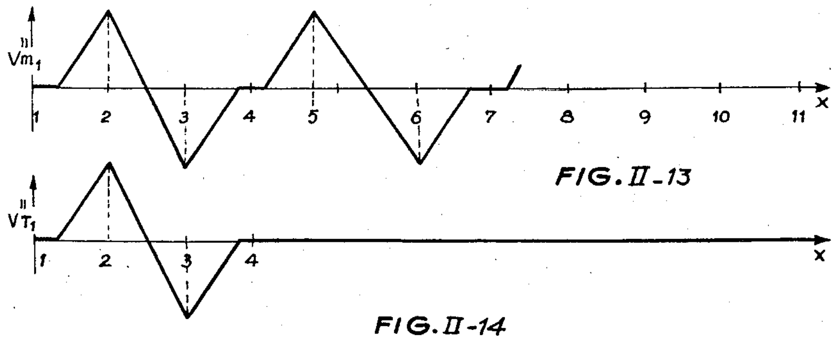
FIG. II-13, FIG. II-14

Nov. 24, 1959 E. HONORÉ ET AL 2,914,250
FUNCTION GENERATOR FOR ANALOG COMPUTER SYSTEMS
Filed April 3, 1957 23 Sheets-Sheet 20
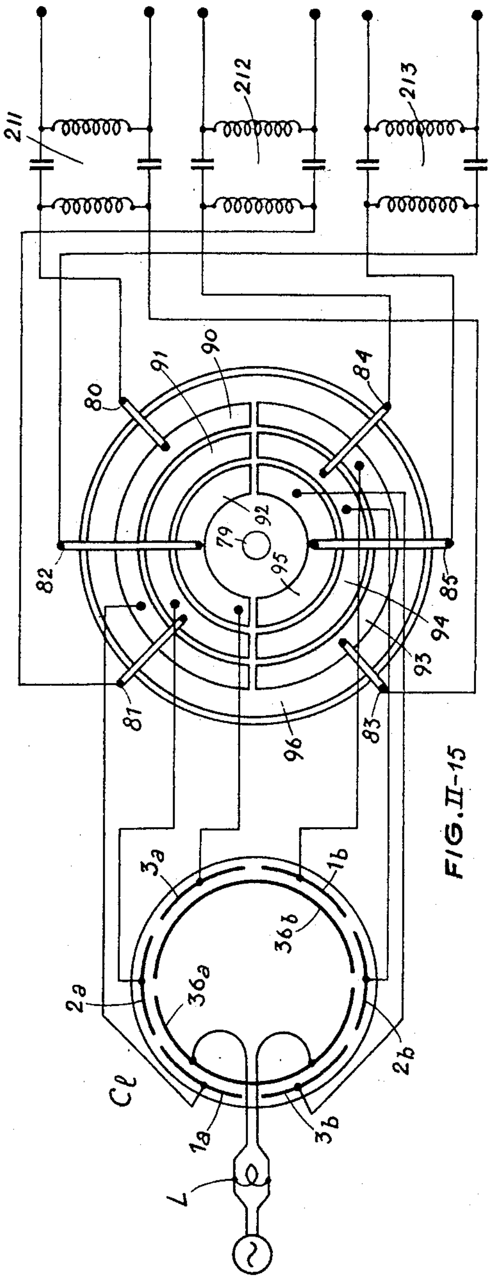
FIG. II-15

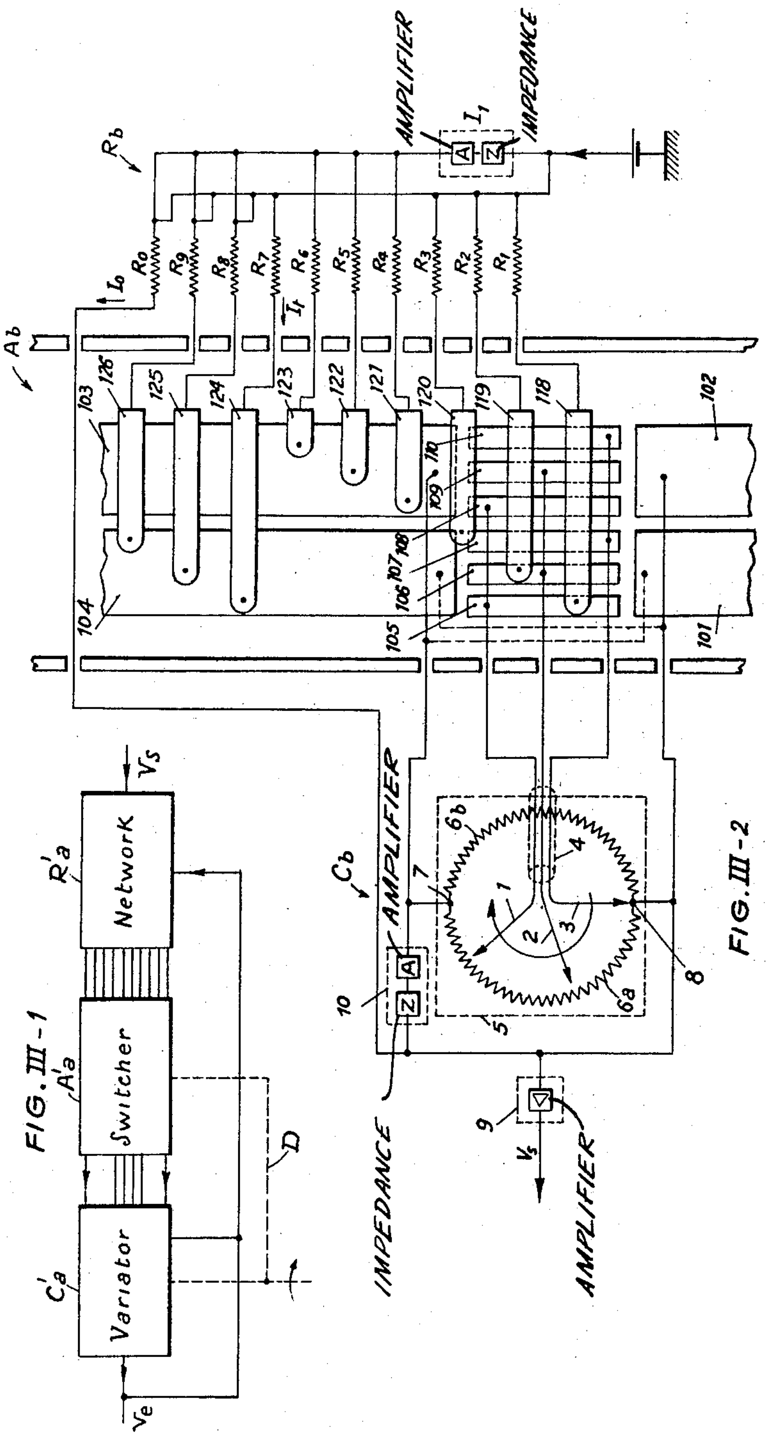
FIG. III-1, FIG. III-2

Nov. 24, 1959 E. HONORÉ ET AL 2,914,250
FUNCTION GENERATOR FOR ANALOG COMPUTER SYSTEMS
Filed April 3, 1957 23 Sheets-Sheet 22
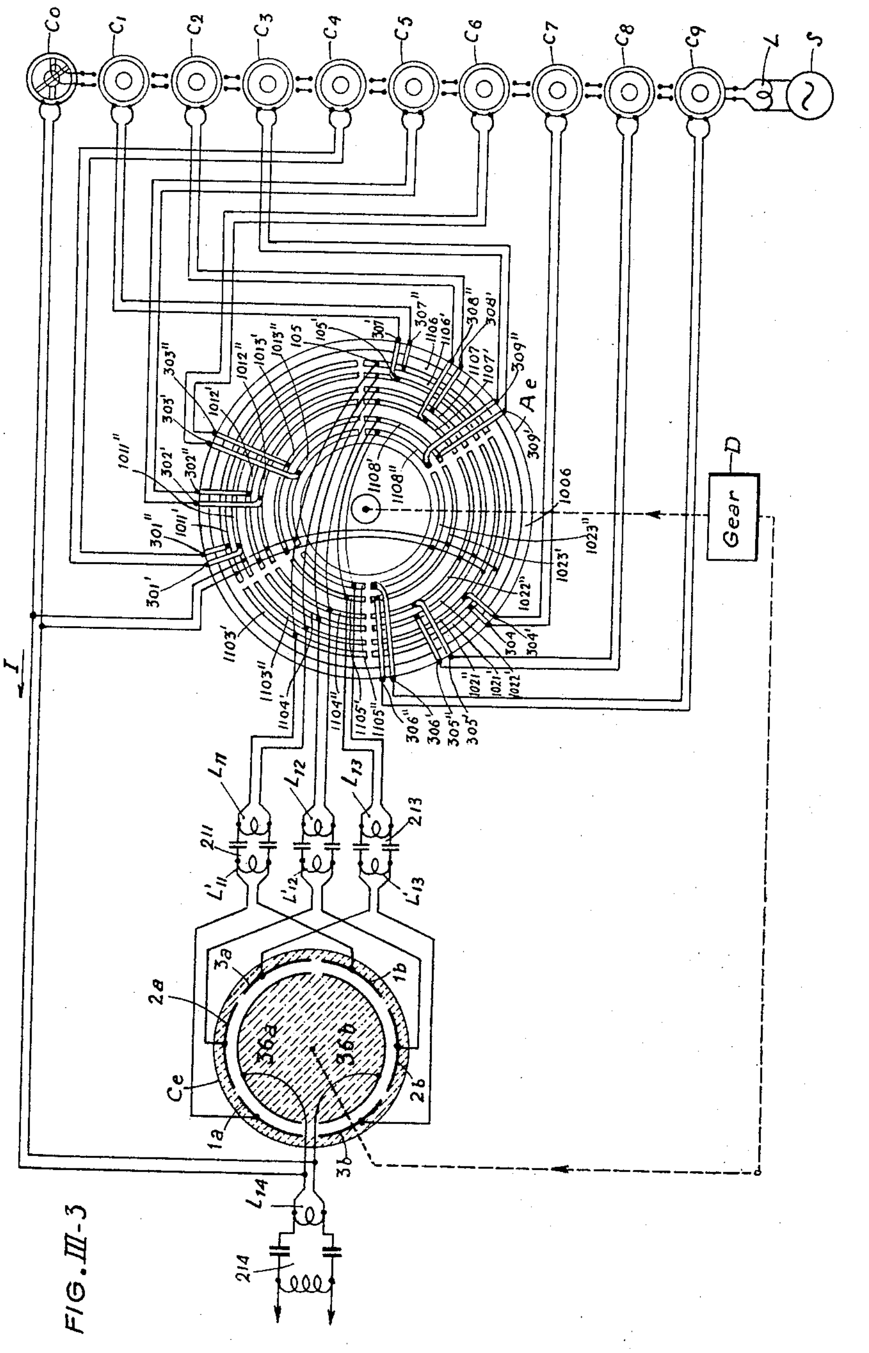
FIG. III-3

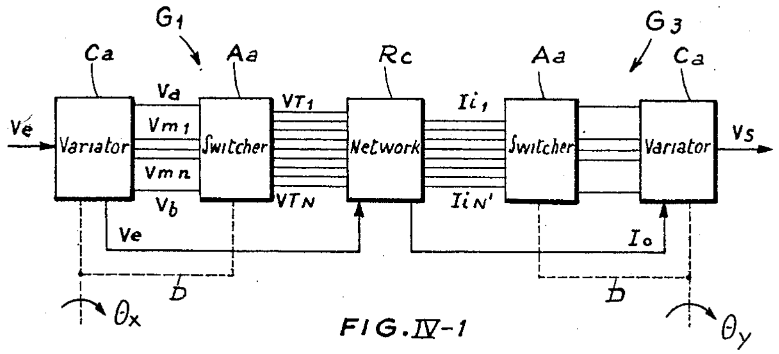
FIG. IV-1
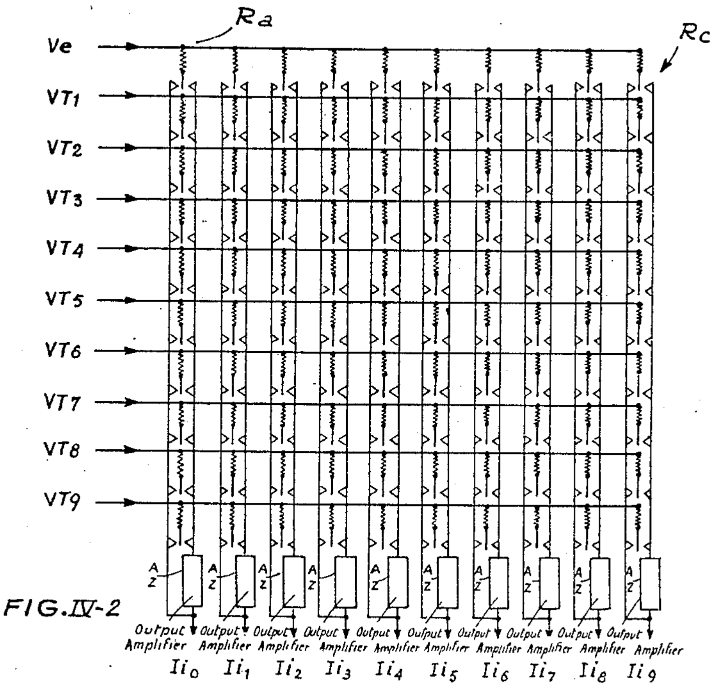
FIG. IV-2

United States Patent Office 2,914,250
Patented Nov. 24, 1959

2,914,250

FUNCTION GENERATOR FOR ANALOG COMPUTER SYSTEMS

Etienne Honoré and Emile Torcheux, Paris, France, assignors to Compagnie Generale de Telegraphie Sans Fil, a corporation of France, and Societe Marocaine de Recherches, d'Etudes et de Developpements "Somarede," a corporation of Morocco Application April 3, 1957, Serial No. 650,390

Claims priority, application France April 12, 1956

38 Claims. (Cl. 235—197)

In the art of analog computing, it is sometimes required to compute, with a rather high degree of approximation, the values of a function $y=F(X)$ within a predetermined range of variation of X, when only a certain number of discrete values of $y$ are known. In other words, it is sometimes required to trace a curve which corresponds to $y=F(X)$, when only a certain number of points of this curve are known, i.e. to generate the function $y=F(X)$, starting from discrete values thereof.

Many systems have been devised in the art of analog electric computers to provide a solution to this problem. Broadly speaking, a circuit is generally provided certain electrical parameters of which can be varied, for instance by means of a mechanical element, such as a shaft. This mechanical element or shaft is controlled in such a way that its position is a linear function of X. An input voltage $V_0$ is applied to the input of the circuit and an output voltage $V_s$ is collected at its output. The circuit is so arranged that the relation $V_s=V_0 \cdot F(X)$ is provided with a degree of accuracy which, of course, may be more or less satisfactory according to the structure of the apparatus. As may be seen, an input voltage is, in fact, multiplied by a variable, generally represented by the position of a mechanical element, to provide an output voltage.

It is an object of the present invention to provide an apparatus of the above type, referred to hereinafter as function generator, having a higher degree of accuracy than those heretofore realized and which is of a comparatively simple structure.

In the following description, applicants will set forth the nature of the invention in a gradual way. They will first disclosed the mathematical basis of the invention and the general concept of the structure which this invention has for its object. The description of several embodiments of the apparatus will then be given, after the main features of a first embodiment have been broadly described.

The description will thus comprise the following sections:

A—Mathematical Basis of the Invention.
B—General Concept of the Structure According to the Invention.
C—Summary Description of a First Embodiment of the Function Generator.
D—Detailed Description of a First Embodiment of the Function Generator.
E—Second Embodiment of the Function Generator.
F—Third Embodiment of the Function Generator.
G—Fourth Embodiment of the Function Generator.

The above mentioned features, as well as many others, will be best understood from the following description and the accompanying drawings, wherein like reference characters designate similar parts throughout all the figures and in which:

Fig. I–1 shows a simplified block diagram of the function generator according to the invention;

Fig. I–2 illustrates the variable original voltages provided in an embodiment of the function generator according to the invention;

Fig. I–3 shows the elementary voltages produced in the same generator;

Figs. I–4 to I–6 illustrate certain mathematical functions used according to the invention;

Fig. I–7 very diagrammatically shows a general view of a first embodiment of the generator according to the invention;

Fig. I–8 shows a linear function of X provided by the generator of Fig. I–7;

Fig. I–9 shows a further function provided by the function generator;

Fig. I–10 shows an error curve relating to the function of Fig. I–9;

Fig. I–11 shows a modification of the switcher used in the generator of the invention.

Figs. I–12 and I–13 show, respectively, the variable original voltage and the elementary periodic voltage curves provided by a generator according to the invention, equipped with the switcher shown in Fig. I–11.

Figs. I–14 to I–16 represent a plurality of periodic function curves obtained by means of the same generator;

Fig. I–17 is an alternative embodiment of the variator used in the function generator according to the invention;

Figs. I–18 and I–19 represent, respectively, the variable original voltages and the elementary voltages obtained in the generator equipped with the variator of Fig. I–17;

Fig. I–20 is another embodiment of the variator;

Figs. I–21 and I–22 represent, respectively, variable original voltage and elementary voltage curves obtained when using the variator illustrated in Fig. I–20;

Figs. I–23 and I–24 show, very diagrammatically and in more detail, respectively, a particular embodiment of the function generator;

Fig. I–25 shows a variator operating on alternating current;

Fig. I–26 illustrates an alternative embodiment of the function generator;

Fig. I–27 is an explanatory diagram referring to Fig. I–26;

Fig. I–28 is another explanatory diagram referring to Fig. I–26;

Fig. I–29 shows a further embodiment of the function generator;

Fig. II–1 shows variable original voltage curves obtained with another type of the function generator according to the invention;

Fig. II–2 shows the corresponding elementary voltages;

Fig. II–3 diagrammatically shows a general view of an embodiment of this type of function generators;

Fig. II–4 shows a detail of the function generator of Fig. II–3;

Figs. II–5 and II–6 show two further details of the same function generator in operation;

Figs. II–7 and II–8 respectively show the periodical original and elementary voltages provided in the function generator of Fig. II–3 when the switcher shown in Fig. I–11 is used;

Fig. II–9 shows a modification of the variator used in Fig. II–3;

Figs. II–10 and II–11 respectively show original voltage and elementary voltage curves obtained when variator of Fig. II–9 is used;

Fig. II–12 shows a further modification of the variator used in Fig. II–3;

Figs. II–13 and II–14 respectively show the original and elementary voltage curves obtained when variator of Fig. II–12 is used;

Fig. II–15 shows a modification of the function generator;

Fig. III–1 is a block-diagram of a further embodiment of the function generator of the invention;

Fig. III–2 shows a particular embodiment of the function generator of Fig. III–1;

Fig. III–3 shows another function generator according to Fig. III–1;

Fig. IV–1 is a block diagram of another embodiment of the function generator provided by the invention;

Fig. IV–2 diagrammatically shows the network used in the embodiment of Fig. IV–1.

A—MATHEMATICAL BASIS OF THE INVENTION

A certain insight into the mathematical background of the present invention is believed to be essential for a clear understanding of the function generator it provides. In the perusal of this part of the specification, particular attention should be given to the symbols and notations employed.

It is known that any function $y=F(X)$ may be replaced, in a given interval of X values such that $X_0<X<X_1$, by a sum of elementary functions defined independently of the function $y$ and having respective coefficients depending on the function $y$, so that one may write:

$$F(X)=A_1f_1(X)+A_2f_2(X)\ .\ .\ .\ A_Nf_N(X) \quad (1)$$

Two kinds of elementary functions are usually employed for effecting such operations:

($a$) continuous functions, the derivatives of which are all continuous in the interval considered, such as the Fourier series, the legendre polynomes etc.

($b$) Discontinuous ladder-shaped functions, the interval being then split into a number of sub-intervals and a constant being substituted for the function $y$ within each one of them.

The first method gives an excellent approximation, even if a restricted number of elementary functions are considered. The number of the coefficients to be calculated is therefore small, but the operations necessary for calculating them are rather complex while the results obtained are uncertain. This is due to the fact that the elementary functions vary in the whole interval considered and that, in order to calculate their coefficients, the values of function F(X) in the whole of the interval must be taken into account.

Elementary discontinuous functions extend respectively over only small portions of the interval considered, which facilitates the calculation of the coefficients to be obtained. However, such functions allow of a good approximation only if taken in great number, requiring, consequently, a great many coefficients to be calculated.

The present invention is based on the use, as elementary functions, of particular functions devised by the inventors, the characteristics of which are intermediate between those of the functions of the two above mentioned types. These functions present the following characteristics:

($a$) they are continuous, as also are their derivatives up to the order $n-1$, but the $n$th derivative is discontinuous;

($b$) each function may be derived from the foregoing by addition of a constant value ΔX, which may for example by equal to 1, to the variable X;

($c$) each function varies as a function of the variable X, according to the following program: in a first portion of the variation interval of the variable X, the function is equal to a constant $a$; in a second portion of the interval, the function varies from the first constant $a$ to a second constant $b$; the length of this interval portion is equal to $n.\Delta X$, $n$ being the number defined hereinbefore; in a third portion of the interval the function remains equal to $b$.

It will be noted that certain properties of the elementary functions of the first type considered above belong to the functions now considered. They are continuous: consequently, their sum is likewise continuous and may replace the function F(X) with substantial approximation, even if their number is small. Certain of the properties of the functions of the second type considered above also belong to these functions. They are local variation functions, i.e. they vary only throughout a portion of the interval; it follows that the coefficients to be assigned thereto may be easily obtained by calculation or adjustment.

It may be shown that for $n=3$, and by adequately choosing the coefficients of the elementary functions, the reproduction of the function $y=F(X)$ is effected with the same accuracy as if, having determined N points of the function curve, this curve were reproduced by causing an elastic strip to pass through these N points.

The elementary functions used by the applicants are selected in a family of functions $h_n(X)$. This family of functions is defined by the function $h_1(X)$, referred to as a function of order 1, and a recurrence law, which will be set forth hereinbelow and enables to pass from the function of the order $n-1$, i.e. $h_{n-1}(X)$, to the function of order $n$, i.e. $h_n(X)$.

Function $h_1(X)$ is a continuous function, the first derivative of which is discontinuous. This function is equal to $-1$ for any value of X interior to $1+k/2$, where $k$ is a small number of the order of 0.1. This function is a linear function of X for $$1+\frac{k}{2}<X<2-\frac{k}{2}$$

and is equal to 1 for any value of X higher than $$2-\frac{k}{2}$$

The law of recurrence is given by the formula:

$$\int_{X-1}^{X} h_{n-1}+(X)dX$$

Figs. I–4 to I–6 show functions $h_1(X)$, $h_2(X)$ and $h_3(X$ respectively. It may be readily shown, from above law of recurrence, that:

$$h_2(X)=-1 \qquad \text{for } X<1+\frac{k}{2}$$

$$\text{varies from}-1\text{ to}+1 \text{ for } 1+\frac{k}{2}<X<3-\frac{k}{2}$$

$$=+1 \qquad \text{for } X>3-\frac{k}{2}$$

$$h_3(X)=-1 \qquad \text{for } X<1+\frac{k}{2}$$

$$\text{varies from}-1\text{ to}+1 \text{ for } 1+\frac{k}{2}<X<4\frac{k}{2}$$

$$=+1 \qquad \text{for } X>4-\frac{k}{2}$$

$$h_n(X)=-1 \qquad \text{for } X<1+\frac{k}{2}$$

$$\text{varies from}-1\text{ to}+1 \text{ for } 1+\frac{k}{2}<X<n+1-\frac{k}{2}$$

$$=+1 \qquad \text{for } n+1-\frac{k}{2}<X$$

and that function $h_n(X)$ has continuous derivatives up to the order $(n-1)$.

For the sake of simplicity, this latter property of function $h_n(X)$ will be henceforth expressed by saying that function $h_n(X)$ is "smoothed" to the $(n-1)$th degree.

In some of the embodiments described function $h_3(X)$ is used as elementary function $f(X)$.

Consequently, Equation 1 may be written:

$$F(X)=A_1h_3(X)+A_2h_3(X-1)\ .\ .\ .\ +A_Nh_3(X-N)$$

It is obviously possible to substitute for any member $A_p h_3(X-p)$ $p$ being any integer between 0 and $n$ of this equation the member:

$$-A_p[-h_3(X-p)]$$

According as this is effected or not, two different types of the function generator according to the invention are obtained.

In certain particular embodiments the derivative of $h_3(X)$ is taken as elementary function $f(X)$.

Thus, to sum up, the mathematical basis of the invention consists in taking in the well known relation $$y=F(X)=A_1f_1(X)+A_2f_2(X)+\ldots A_Nf_N(X)$$

as elementary functions $f(X)$, the above defined local variation function $h(X)$, and more particularly the function $h_3(X)$, or a derivative thereof, for successive values of X.

B—GENERAL CONCEPT OF THE STRUCTURE ACCORDING TO THE INVENTION

The invention has for its object to provide a system of the above mentioned type capable of traducing the above Equation 1.

This system essentially comprises three devices, respectively capable of performing the following functions:

(*a*) a first device capable of receiving an input voltage $V_e$ and of providing a plurality of periodic voltage functions, phase shifted with respect to each other, and which, within certain limits of the variable X, constitute the variable portion of the above local variation functions, used according to the invention as elementary functions $f(X)$;

(*b*) a second device capable of switching, from the voltage functions provided by the first device, these respective local variation portions to obtain another plurality of voltage functions which simulate the above elementary functions $f(X)$;

(*c*) a third device capable of receiving the elementary voltage functions from the second device, multiplying them by respective coefficients $Ap$, which have been previously introduced therein, and summing up the elementary voltage functions $Apfp(X)$ thus obtained to provide a voltage which simulates the function $y=F(X)$.

When the variable X is continuously varied, a continuous function $y$ is thus provided in terms of a voltage at the output of the third device.

For the sake of simplicity the first device will be henceforth called "X—variator," or simply "variator," since it translates the variations of the variable X. The voltages supplied by the variator will be called "original voltages" since they are the origin of the other voltage functions provided in the system.

The second device will be called "switcher," since it switches out of the voltage functions provided by the variator the portions thereof useful for the invention. The voltage functions supplied by the switcher will be called "elementary voltages" since they correspond to elementary functions.

The third device will be called "coefficient network," or simply "network," since it simulates and inserts the coefficients by which elementary voltage functions $f(X)$ are multiplied to provide the voltage function $y=F(X)$.

Surprising as this may seem at first sight, the system is practically reversible, i.e. the input and the output thereof are interchangeable. While the individual functions of each of the three devices, comprised in the function generator is not quite the same as before, when the generator is operated in this latter way, the ultimate result remains the same i.e. the equation $V_s=V_e.F(X)$ holds still true.

As will be seen later, a variator of whatever type comprises two inputs and $n$ outputs. Each input is coupled to an output through a variable parameter circuit, this parameter being variable with respect to X. Such a circuit may comprise a potentiometer, a transformer with a variable coupling or calculator of the two quadripole type networks as described in the U.S. Patent No. 2,785,853. Two circuits are also provided in which the same respective parameters have values constant with respect to X and which are coupled to the input of the function generator unless they are grounded. The variable parameter circuits have these parameters varying without mathematical discontinuity between these two values constant with respect to X and which are preferably equal in absolute value.

The switcher comprises $n+2$ inputs and N outputs respectively coupled to the N circuits of the network, the respective parameters of which simulate the various coefficients A of Equation 1.

The switcher is purported to provide elementary functions $f(X)$ of Equation 1 by coupling, in succession, each one of the N inputs of the network to one of the circuits having their parameters constant with respect to X, to one of the variator circuits having their parameters variable with respect to X, taken in succession, and to the other circuit having its parameter constant with respect to X. This switching takes place without discontinuity to provide three portions of each elementary function $f(X)$, without mathematical discontinuity therebetween; in the first and in the third portion, function $f(X)$ has a constant value. The second, or intermediate, portion is the local variation portion of the function $f(X)$.

Elementary functions $f(X)$ are multiplied by their respective coefficients A to provide elementary functions $A.f(X)$, the sum of which is equal to $y$ in accordance with Equation 1.

Of course, if the input and the output of the generator are interchanged, the respective inputs of the three essential component devices building up the generator become outputs and vice versa.

C—SUMMARY DESCRIPTION OF A FIRST EMBODIMENT OF THE FUNCTION GENERATOR

Fig. I–1 shows a block diagram of a function generator provided by the invention. As already mentioned it comprises the variator $C_a$, the switcher $Aa$ and the network $Ra$. An input circuit is connected to feed an input voltage $V_e$ to variator $C_a$ which in turn supplies two constant original voltages $Va$ and $Vb$ and $n$ variable original voltages $Vm1$, $Vm2$ . . . $Vmn$. The respective values of these voltages depend both on $Ve$ and on the position of a mechanical element, for example the angular position $\theta$ of a shaft 4 controlling the variator.

The angular position $\theta$ of the shaft, starting from a reference position, is defined as a function of the variable X by writing down $$\theta=\frac{\pi}{n}(x-1)$$

Two main types of variators may be used in the embodiment considered. With a first type of variator, variable original voltages $Vm1$ . . . $Vmn$ vary as a function of X according to Table I given below, where $p$ is the rank of the variable original voltage considered, $k$ having the previously defined value:

*Table I*

Values of $Vmp$ as a function of X:

| When X varies from— | to— | $Vmp$ |
|---|---|---|
| $p-k/2$ | $p+k/2$ | $=Va$ |
| $p+k/2$ | $n+p-k/2$ | varies from $Va$ to $Vb$ |
| $n+p-k/2$ | $n+p+k/2$ | $=Vb$ |
| $n+p+k/2$ | $2n+p-k/2$ | varies from $Vb$ to $Va$ |
| $2n+p-k/2$ | $2n+p+k/2$ | $=Va$ |

With a second type of variator, voltages V$mp$ vary as shown in the following Table II:

*Table II*

Values of V$mp$ as a function of X:

| When X varies from— | to— | V$mp$ |
|---|---|---|
| $p-k/2$ | $p+k/2$ | =0 |
| $p+k/2$ | $n+p-k/2$ | raises to a maximum and returns to 0 |
| $n+p-k/2$ | $n+p+k/2$ | =0 |
| $n+p+k/2$ | $2n+p-k/2$ | decreases to a minimum and returns to 0 |
| $2n+p-k/2$ | $2n+p+k/2$ | =0 |

In the first embodiment the function is preferably smoothed to the degree $(n-1)$.

In the second embodiment, the function is preferably smoothed to the $(n-2)^{nd}$ degree.

Voltages provided by variator C$a$ are fed to the input of switcher A$a$.

Switcher A$a$ essentially comprises a plurality of elementary switches, the operation of which is tied to the operation of variator C, for example is controlled by the variator shaft through a reduction gear D. The switcher supplies N elementary voltages VT1, VT2 . . . VTN, N being a multiple of $n$, for instance=9. As a function of the values of X, the elementary voltages are equal either to the variable original voltages or to the constant original voltages respectively, as shown in the following table:

*Table III*

VT1:
- For X<1 ---------------- VT1 is equal to V$a$.
- For X comprised between 1 and $n+1$ ---------------- VT1 is equal to V$m$1.
- For X>$n+1$ ---------------- VT1 is equal to V$b$.

VT2:
- For X<2 ---------------- VT2 is equal to V$a$.
- For X comprised between 2 and $n+2$ ---------------- VT2 is equal to V$m$2.
- For X>$n+2$ ---------------- VT2 is equal to V$b$.
- And so on up to VT$n$ VT3$(n-1)$:
- For X<$n+1$ ---------- VT$(n+1)$ is equal to V$b$.
- For X comprised between $n+1$ and $2n+1$ ---------- VT$(n+1)$ is equal to V$m$1.
- For X>$2n+1$ ---------- VT$(n+1)$ is equal to V$a$.
- And so on up to VT$2n$ VT$(2n+1)$:
- For X<$2n+1$ ------ VT$(2n+1)$ is equal to V$a$.
- For X comprised between $2n+1$ and $3n+1$ ------ VT$(2n+1)$ is equal to V$m$P.
- For X>$3n+1$ ------ VT$(2n+1)$ is equal to V$b$.

and so on, substituting V$b$ for V$a$ and vice versa every time the rank of the elementary voltage is increased by $n$.

Voltages VT1 to VT9 are shown in Fig. I–3. Considering for example VT1, it is seen that it is a function of X and is equal to V$a$ for any value of X inferior to 1, equal to V$m$1, which increases from V$a$ to V$n$, for 1<X<4 and equal to V$b$ for X>4.

It will be noted: that at the instant voltage VT1 is switched from V$a$ to V$m$1, or from V$m$1 to V$b$, V$m$1 is equal to V$a$ or V$b$ respectively; that there is no discontinuity between V$a$ and V$m$1, or V$m$1 and V$b$, at the moment of the switching, since both voltages concerned are equal at that moment and, accordingly, the switching operation must extend over $k$ units of the variable X, $k$ being equal, for example, to 0.1; that to ensure continuity of the elementary voltage curves during the switching of VT1 from V$a$ to V$m$1 or from V$m$1 to V6, the switcher must be arranged to be connected to, or disconnected from, V$m$1 before being disconnected from, or connected to, V$a$ or V$b$.

Accordingly VT1 is a "smoothed" function of X.

Functions VT2, VT3, VT7, VT8, VT9 are obtained by laterally shifting function VT1 by ΔX values equal to 1, 2, 6, 7 and 8 respectively. Function VT4 is obtained from the decreasing variable portion of function V$m$1. This function is equal to V$b$ for X<4, equal to V$m$1, which decreases from V$b$ to V$a$ for 4<X<7, and equal to V$b$ for X>7. Functions VT5 and VT6 result from function VT4 shifting the latter by values of ΔX respectively equal 1 and 2. Function VT4 is derived from function VT1 by a symmetry rotation about a straight line normal to X axis and passing through $X=4$. In other words, function V$m$1 will be selected so that it admits as axes of symmetry the straight lines passing by its maxima or its minima, perpendicular to the X axis.

The N elementary voltages VT1, VT2 . . . VTN, which correspond to elementary functions $f(X)$, are fed to network R$a$ which also may receive input voltage V$e$, as will be explained later. The network comprises N variable parameter circuits for simulating the various coefficients A. The respective coefficients A having been thus "introduced" into the network, elementary functions A$p$.VT$p$ are summed up at the output of the network to provide an output voltage V$s$ which thus simulates the function $y=F(X)$ by simulating the equality 1.

D—DETAILED DESCRIPTION OF A FIRST EMBODIMENT OF THE FUNCTION GENERATOR

As an example, in the following description it will be assumed that $n=3$ and $N=9$, i.e. that three variable original voltages V$m$1 to V$m$3, and nine elementary voltages VT1 to VT9 will be provided. For the sake of simplicity it will also be assumed that V$e$ is constant, although this is not necessary.

(a) VARIATOR

The function generator shown in Fig. I–7 is equipped with a variable C$b$ fed by D.C. voltage. It comprises a potentiometer 5 with a circular winding 6 having two input terminals 7 and 8.

Potentiometer 5 has three movable contacts 1, 2, 3 carried by a shaft 4 whose angular position is determined by an angle $\theta$ which is the opening angle of the potentiometer sector comprised between movable contact 1 and terminal 8 and the positive direction of which is indicated by an arrow. Movable contacts, 1, 2 and 3 are in fixed relationship with respect to each other and are angularly spaced from each other by $\pi/3$.

Winding 6 is divided by terminal contacts 7 and 8 into two equal portions 6$a$ and 6$b$. Winging portion 6$a$ is wound in accordance with the following relation:

$$r(\theta)=r_o[1+\varphi(\theta)]$$

where $r(\theta)$ designates the resistance of the winding portion comprised between contact 8 and the point separated therefrom by the angle $\theta$, $r_o$, one half the resistance of winding portion 6$a$, and $\varphi(\theta)$ a function "smoothed" to the degree two, varying from −1 to +1 when $\theta$ varies from 0 to $\pi$. This is precisely the function $h_3(X)$ as defined above, taken in the interval from 1 to 4, when $\theta=\pi/3(X-1)$, as mentioned above. The winding portion 6$a$ is symmetrical to portion 6$b$ with respect to the diameter passing through terminal contacts 7 and 8.

Each contact 7 and 8 extends over a small angular sector whose opening angle $k.\pi/3$ is the switching angle, $k$ being the coefficient already mentioned. It follows that $\varphi(\theta)$ remains equal to −1, or to +1, when $\theta$ deviates from 0, or from $\pi$, by a value less than $k/2\pi/3$.

A source 11 supplies input voltage V$e$ to contacts 8 and 7, for instance through units 9 and 10 respectively. Units 9 and 10 are of a well known type and comprise each an impedance Z and a high-gain, negative feedback amplifier A connected in series. The input voltage of unit 9 being V*e*, the respective output voltage of units 9 and 10 are a negative voltage V*a* and a positive voltage V*b* which are the respective potentials of terminal contacts 8 and 7. It may be conveniently assumed that $Va=-Ve$ and $Vb=Ve$.

Movable contacts 1, 2 and 3 are respectively connected to impedor—amplifier units 11, 12 and 13, similar to units 9 and 10 and at the output of which voltages —V*m*1, —V*m*2 and —V*m*3 are collected.

When $\theta$ varies from 0 to $2\pi$, movable contact 1 bears successively on one half of fixed contact 8, winding portion 6*a*, fixed contact 7, winding portion 6*b* and the second half or fixed contact 8. Voltage V*m*1 supplied thereby is equal to V*a* when movable contact 1 bears on the first half of fixed contact 8, i.e. when $\theta$ is less than $\pi/3.k/2$; is equal to $Ve.\varphi(\theta)$ while running on winding portion 6*a*, i.e. when $\theta$ is comprised between $k/2.\pi/3$ and $\pi-\pi/3.k/2$; is equal to V*b* when bearing on fixed contact 7, i.e. when $\theta$ is comprised between $\pi-k/2.\pi/3$ and $\pi+k/2.\pi/3$; is equal to $Ve.\varphi(2\pi-\theta)$ while running over winding portion 6*b*, i.e. when $\theta$ is comprised between $\pi+k/2.\pi/3$ and $2\pi-\pi/3.k/2$; and assumes again the value V*a* when bearing on the second half of fixed contact 8, i.e. when $\theta$ is comprised between $2\pi-k/2.\pi/3$ and $2\pi$. Voltages V*m*2 and V*m*3 follow the same variation curves as V*m*1; these curves are phase shifted by $\pi/3$ and $2\pi/3$ respectively with respect to V*m*1 curve.

Fig. I–2 illustrates the respective variation curves as functions of X of the three variable original voltages V*m*1, V*m*2, V*m*3 supplied by variator C*b*.

It is readily seen that each of these voltages is a continuous and periodic function of X, of a period $2n=6$, and that the three curves are phase shifted with respect to each other as indicated above, the two phase shifts corresponding to $X=1$ and $X=2$ respectively.

(*b*) LINEAR SWITCHER

The switcher A*b* used in the function generator of Fig. I–7 comprises an insulating plate 100, shaped as a rectangular strip. On this plate are secured four identical, rectangular contact plates 101, 102, 103, 104 and six smaller rectangular contact plates, also identical, 105, 106, 107, 108, 109, 110.

Contact plates 105, 106, 107 are inserted between contact plates 101 and 104 which are located in continuation of each other, and contact plates 108, 109 and 110 occupy the same position with respect to contact plates 103, and 102, as shown in the figure.

Contact plates 103 and 104 are brought to constant original potential V*a*, contact plates 102 and 101 to constant original potential V*b*, contact plates 105 and 108 to variable original potentials V*m*1, contact plates 106 and 109 to variable original potential V*m*2 and contact plates 107 and 110 to variable original potential V*m*3.

Stationary brushes 118, 119, 120, 121, 122, 123, 125, 126 are disposed in such a way that each one is, as shown in Fig. I–7, in slidable contact with two constant original voltage plates and the variable original voltage plate located therebetween, when strip 100 is moved lengthwise.

The brushes are spaced lengthwise of strip 100, by a distance taken as a unit of length. The length of the assembly formed by the six contact plates 105 to 110 is equal to *n* these units i.e. to three units in the present instance.

Under these conditions, when strip 100 moves in the direction of the arrow,

Brush 118 comes successively into contact with plates 104, 105, 101
Brush 119 comes successively into contact with plates 104, 106, 101
Brush 120 comes successively into contact with plates 104, 107, 101

Brush 121 comes successively into contact with plates 102, 108, 103
Brush 122 comes successively into contact with plates 102, 109, 103
Brush 123 comes successively into contact with plates 102, 110, 103
Brush 124 comes successively into contact with plates 104, 105, 101
Brush 125 comes successively into contact with plates 104, 106, 101
Brush 126 comes successively into contact with plates 104, 107, 101

It is to be noted that the size of the brushes is such that when, for instance, brush 118 passes from plate 104 to plate 105, it will get in contact with the latter before breaking contact with the former.

A device D of any suitable known per se type, diagrammatically shown in Fig. I–1, is adapted to tie the angular displacements of variator movable contacts 1, 2 and 3 and the linear displacements of plate 100, so as to cause the latter to suffer a translation movement of X units in the direction of the arrow, when the variator brushes are subjected to a rotation of X. $\pi/n$ radians.

The interconnection of the two displacements is such that when one of the brushes 118 to 126 is in contact both with one of the contact plates 101 to 104 and with one the contact plates 105 to 110, the position of the movable contacts 1, 2 and 3 is such that the two short-circuited contact plates are at the same potential.

The operation of the device will be explained by reference to one of the brushes, say brush 118. As long as this brush runs over plate 104, voltage VT1 supplied thereby is equal to V*a*; while brush 118 is passing from plate 104 to plate 105, voltage VT1 is switched from voltage V*a* to voltage V*m*1, which voltages are at that instant equal, since the switching takes place at the instant when movable contact 1 engages fixed contact 8; while brush 118 runs over plate 105, VT1 is equal to V*m*1; when brush 118 passes from plate 105 to plate 101, voltage VT1 is being switched from voltage V*m*1 to voltage V*b*, which voltages are at that instant equal, since the switching occurs while movable contact 1 is on fixed contact 7; when brush 118 is in contact with plate 101 voltage VT1 is equal to V*b*.

Voltage VT1 to VT9 curves are shown in Fig. I–3.

(*c*) NETWORK

The function generator shown in Fig. I–7 comprises a network R*b*.

This network comprises a plurality of resistances $R_0$, $R_1$, $R_2$ . . . $R_8$, $R_9$. Resistances $R_1$ . . . $R_9$ are fed, respectively, with elementary voltages VT1 to VT9 and input voltage V*e* is applied to resistance $R_0$ through impedor-amplifier units 9 and 14. If all the coefficients $A_1$ to $A_9$, which are calculated by means of known discrete values of *y*, carry the same sign, resistances $R_1$, $R_2$, $R_3$, $R_7$, $R_8$ and $R_9$ are directly connected to the input of an amplifier $A_2$ and resistances $R_4$, $R_5$, $R_6$ are connected to amplifier $A_2$ through a high gain, negative feedback amplifier $A_1$, feeding an impedance $Z_1$, this amplifier-impedor unit operating as a current inverter.

The output voltage V*s* is collected at the output of amplifier $A_2$.

The operation of Summing Network R*b* is as follows:

Amplifier $A_2$ sums up the intensities collected at the output of resistances $R_1$ to $R_9$ after the polarity thereof has been reversed or not by unit 15. Voltage V*s* is thus the sum of the nine elementary voltages and of voltage V*e*:

$$Vs=A_0\cdot Ve+A_1\cdot VT1+\ .\ .\ .\ +A_9\ VT9$$

which simulates the function $$y=A_0+A_1f(X)+A_2\cdot f_2(X)\ .\ .\ .\ A\cdot f_N(X)$$

$A_0$ . . . through $A_9$ being translated into the resistance.

values of resistors $R_0$ through $R_9$. These resistors are adjustable. Their adjustment enables the respective coefficients A, belonging according to Equation 1 to the function to be generated by the system, to be simulated by the network R*b* and thus inserted into the function generator. To calculate these ten coefficient values, it suffices to have ten discrete values of the function $y=F(X)$ in the interval concerned. The resistance $R_0$ enables translations of the function to be effected by addition of a constant thereto.

(*d*) Some examples of functions which may be provided by the function generator.

It will now be shown, by way of example, how a system provided by the invention and shown in Fig. I–7, may be used for generating a linear function of X. It is known that in the case of such a function the various coefficients A*p* of Equation 1 are equal and inversely proportional to $$\frac{dy}{dX}$$

Accordingly, resistances $R_1$ to $R_9$ are made equal and inversely proportional to the derivative of function *y*. Fig. I–8 shows the curve representative of the function which is generated by the system of Fig. I–7 under these conditions. This curve is a straight line in the interval comprised between X values 3 and 10. In the intervals 1 to 3 and 10 to 12, the curve is merging with the upper and lower levels which correspond respectively to $X<1$ and $X>12$, which correspond to the constant original voltages used in the system.

Fig. I–9 shows the function provided by the function generator when resistances $R_0$ to $R_9$ have been selected so as to simulate the function $y=\log X$ in the interval $12<X<40$ and Fig. I–10 shows the difference $Z=Vs/ve-\log X$. The latter is found to be always less than $10^{-5}$. The resistances have the following respective numerical values:

$R0=10^6/128.176$, 116 ohms
$R1=10^6/8.368$, 156 ohms
$R2=10^6/6.086$, 176 ohms
$R3=10^6/4.767$, 744 ohms
$R4=10^6/3.916$, 352 ohms
$R5=10^6/3.321$, 504 ohms
$R6=10^6/2.882$, 368 ohms
$R7=10^6/2.546$, 240 ohms
$R8=10^6/2.278$, 496 ohms
$R9=10^6/2.067$, 680 ohms (*e*) CIRCULAR SWITCHER Fig. I–11 shows another embodiment of the switcher. The device is circularly shaped and, in the embodiment shown, is capable of providing, starting from three original variable voltages, nine elementary voltages, as the switcher A*b* shown in Fig. I–7.

Switcher A*c* comprises a rotatable ring-shaped plate **100*a*, made of an insulating material. Three conducting plates 1011, 1012, 1013 and three similar plates 1021, 1022, 1023 are deposited on ring plate 100*a*, symmetrically with respect to a diameter of the ring. They are in the shape of ring sectors, having the same opening angle. In the free spaces left between these two sets of plates and insulated therefrom, six plates 1103 through 1108 are arranged. Means are provided, as in Fig. I–7, for raising plates 1011, 1012 and 1013** to potential V*b*, plates 1021, 1022 and 1023 to potential V*a* and plates 1103—1106, 1104—1107, 1105—1108, respectively, to potentials V*m*1, V*m*2, V*m*3. Thus it will be readily seen the original constant voltage plate assemblies 1011, 1012, 1013 and 1021, 1022, 1023, respectively, correspond to plate assemblies 101, 102 et 103, 104 of Fig. I–7.

Brushes 301 through 309 are secured to a ring-shaped, stationary plate 300, concentric with plate **100*a*. Brushes 301, 304, 307 are located in such a manner that, when plate 100*a* rotates about its axis, they sweep successively plates 1011, 1103, 1021, 1106. Brushes 302, 305, 308 are arranged so as to sweep in succession plates 1012, 1104, 1022, 1107 and brushes 305, 306, 309, so as to sweep plates 1013, 1005, 1023, 1108** respectively.

This switcher, just as that illustrated in Fig. I–7, is capable of providing, from the original voltages of Tables I and II, the elementary voltages listed in Table III. Its movement is of course tied to that of the variator in any suitable way, as explained above.

Referring to Fig. I–7 and Table III, it will be seen that when the variator contacts have rotated by an angle $\pi$, rotatable contact 1 passes from fixed contact 7, over the intermediate winding portion **6*a*, to fixed contact 8**. This corresponds to an increase of the variable X by $\Delta X=3$. Moreover, elementary voltage V*m*1 passes from V*a* to V*b* without discontinuity. To this rotation corresponds, for switcher A*c*, a rotation angle $\theta_1$ such that brush 301, which provides elementary voltage VT1, has moved through plate sector 1103. Accordingly, angle $\theta_1$ is the opening angle of the variable voltage pates 1103 through 1108. The gear ratio to be adopted between the variator of Fig. I–7 and switcher A*c* is $\theta_1/\pi$.

The contacts of each brush set 301, 302, 303 or 304, 305, 306 or 307, 308, 309 are therefore shifted with respect to each other by an angle corresponding to $X=1$ i.e. $\theta_1/3$ in the present example or generally to $\theta_1/n$.

Referring to Table III, it will be seen that for $X=n+1$, i.e. $X=4$ in the present case, VT$n+1$, i.e. VT4 in this case begins its variation, whereas VT1 terminates the same. Contact plate sector 1011 has therefore an opening angle $\theta_2$ such that, when brush 301 leaves plate 1103, brush 304 gets in contact with plate 1106. Brushes 301 and 304 are therefore shifted with respect to each other by the angle $\theta_2$, the same being true for brushes 301 and 307. It follows that $\theta_2$ corresponds to $\Delta X=6=2n$ i.e. that $\theta_2=2\theta_1$.

The Switcher of Fig. I–11 may obviously be used for generating periodic functions. Elementary voltage curves illustrated in Fig. I–12 are identical to those shown in Fig. I–2. As to the elementary voltages shown in Fig. I–13 they are periodical, contrary to what occured in the case of Fig. I–3. In the present case, when X has increased by 9, or by N, i.e. when plate **100*a*** has rotated by half a revolution, the plates raised to the potential V*b* occupy the previous position of the plates having the potential V*a* and brushes 301, 302, 303 assume, with respect to contact plates 1106, 1107, 1108, the position they occupy in Fig. I–11 with respect to contact plates 1103, 1104, 1105. Voltage curve VT2 initiates at that moment its descending slope from V*b* level towards V*a* level. When plate **100*a*** has completed a revolution, the pattern represented in Fig. I–11 is reproduced again. At this instant, X has increased by 18. Thus elementary voltages VT have a repetition period $X=18$ or $X=2N$. If the network has not been modified in the meantime, the generated function is thus periodically repeated.

More generally, with a switcher of this type the period of the variable original voltages is $2n$. That of the elementary voltages is $2N$.

Fig. I–14 shows a periodical linear function similar to that of Fig. I–8 and obtained with the function generator of Fig. I–7 incorporating the switcher A*c* of Fig. I–11.

Fig. I–15 represents the variations of $Vs/Ve$ when a sinusoidal function $F(X)=-\cos 2\pi(X-2)/18$ has been "inserted" into the network. It may be shown that this can be done by giving to resistances $R_0$ through $R_9$ values inversely proportional to sin $$\frac{2\pi p}{18}$$

*p* indicating the rank of the resistance considered.

Fig. I–16 represents the error function $Vs/Ve-F(X)$. This function is always comprised between $-10^{-5}$ and $10^{-5}$.

(*f*) MODIFICATIONS OF THE VARIATOR

The function generator as described so far can also be equipped with another type of X-variator in which no constant original voltages are used i.e. $Va=Ve=0$.

This modification will now be described in a particularly useful application thereof i.e. for providing the first derivative $$\frac{dy}{dX}$$

of function $y=F(X)$. Of course, this modification can also be used for providing any other continuous function. The function generator has in this case the same structure as that shown in Fig. I–7, except that its X—variator Cc is slightly different and that the constant original voltages V*a* and V*b* are made equal to zero.

This X—variator is shown in Fig. I–17. It comprises a potentiometer 5*a* similar to that of Fig. I–7, except for the features which will be hereunder specified. Two diametrically opposed points 7*b* and 8*b* of the potentiometer winding are grounded. Two other points 7*a* and 8*a*, placed at the ends of the diameter perpendicular to the diameter passing through points 7*b* and 8*b*, are respectively brought to potential $+Ve$ and $-Ve$ by means of units 9 and 10, connected as in Fig. I–7.

When shaft 4 carrying brushes 1, 2 and 3 is rotated, the brushes run in succession over the winding portion 6'*a*, contact 8*b*, winding portion 6'*b* and contact 7*b*. Variable original voltages are taken from the variator in the same way as in Fig. I–7. Winding portions 6'*a* and 6'*b* are identical. The winding law is:

$$r(\theta)=r_0.\Phi(\theta)$$

where $r_0$ designates one half of the winding portion, 6'*b* resistance, $r(\theta)$ the resistance of the winding portion 6*b* comprised between tap 8*b* and movable contact 1, $\Phi(\theta)$ a continuous function of angle $\theta$ proportional to the derivative of function $\Phi(\theta)$, as defined hereinabove, with respect to $(\theta)$. This function is preferably smoothed up to the first order, and equal to 0 for $\theta=0$, to 1 for $\theta=\pi/2$ and to 0 for $\theta=\pi$.

As in the first example, contacts 7*b* and 8*b* cover an angular sector the opening angle of which is $k.\pi/3$.

Fig. I–18 shows the variation curves of the three original variable voltages V'*m*1, V'*m*2, V'*m*3 provided by the variator shown in Fig. I–17, X being equal to $$1+\frac{\theta}{\pi/3}$$

Fig. I–19 represents the nine elementary voltages V'T1 to V'T9 which may be obtained by associating the variator of Fig. I–17 with the switcher of Fig. I–7. Of course the switcher will be tied in motion with the variator, as explained above. It will have to progress by one unit when the variator has rotated by $\pi/n$ radian i.e. for $\Delta X=1$. This tying is such that when one of the brushes 118 to 126 is simultaneously engaging one of the plates 105 to 110 and one of the plates 101 to 104, a movable contact 1, 2 or 3 engages one of the fixed contacts 7*b* or 8*b*. Of course, plates 101 to 104 are in this case grounded.

The functions provided are "smoothed" functions, since the switcher brushes short-circuit the plates, respectively brought to a fixed or a variable original potential, only when both are at the same potential i.e. are grounded.

It will be readily seen that functions V'T1 to V'T9 are respective derivatives of functions VT1 to VT9 with respect to X, the intervals where functions V'T are equal to 0 corresponding to the intervals where functions V'T are constant, i.e. have a derivative equal to 0. In the interval where they vary, they are respectively equal to variable original voltages V'*m* which are the derivatives of functions V*m*.

The function generator equipped with the X—variator of Fig. I–17 may provide at the output thereof a voltage functions which is the derivative of V*s* with respect to X, i.e.

$$V'_s=Ve.\frac{dF(X)}{dX}$$

since this voltage function is a sum of elementary derivatives.

Fig. I–20 shows a variator C*d*, adapted to supply variable elementary voltages which are the respective second derivatives of the voltages shown in Fig. I–2 with respect to X. The law according to which the two winding portions 6''*a* and 6''*b* of potentiometer 5*b* of this variator are wound is linear and points 7*b* and 8*b* are grounded, as in the previous case. Intermediate and regularly spaced taps 17*a*, 17*b*, 18*a*, 18*b* are provided between points 7*b* and 8*b*. Taps 17*b* and 18*a*, are brought to the potential $+Ve$ by means of units 9 and 10, taps 17*a* and 18*b* being brought to the potential $-Ve$ by means of unit 9. Figs. I–21 and I–22 show respectively original voltage V*m*1 to V*m*3 and elementary voltage VT1 to VT9 curves obtained with this variator, the same switcher as above being used.

In the same way as above it may be shown that, the output voltage V''*s* is equal to $$V''e.\frac{d^2F(X)}{dX^2}$$

(*g*) MODIFICATIONS OF THE FUNCTION GENERATOR

Figs. I–23 and I–24 illustrate, very diagrammatically and in more detail respectively, a function generator which is capable of receiving three input voltages V*e*, V'*e*, V''*e* and supplying two output voltages $Vs_I$ and $Vs_{II}$ such that $$Vs_I=Ve\cdot F(X)+V'e\cdot\frac{dF(X)}{dX}+V''e\cdot\frac{d^2F(X)}{dX^2}$$

$$Vs_{II}=Ve\cdot G(X)+V'e\cdot\frac{dG(X)}{dX}+V''e\cdot\frac{d^2G(X)}{dX^2}$$

Of course, a common input voltage V*e* may be used instead of three different input voltages.

This function generator is thus capable of simulating the respective sums of two independent functions F and G and of their respective first and second derivatives.

The corresponding elementary functions coefficients A are inserted into two separate networks $R_I$ and $R_{II}$ by means of resistances $R_1$ through $R_9$ and $S_1$ through $S_9$, respectively.

Three variators C*b*, C*c*, C*d* are used. They are respectively similar to those shown in Figs. I–7, I–17 and I–20 and need not be described again. Only one switcher A*a* is used.

Impedor-amplifier units 11*b*, 12*b*, 13*b*, of the same type as described above, are connected as shown to sum up the variable original voltages respectively provided by the three variators C*b*, C*c*, C*d* to supply to switcher A*a* the following voltages:

$$Um1=Vm1+V'm1+V''m1$$
$$Um2=Vm2+V'm2+V''m2$$
$$Um3=Vm3+V'm3+V''m3$$

Switcher A*a* may be of any type described so far. Switcher A*d* shown in Fig. I–24 is that represented in Fig. I–11.

Nine elementary voltages sums UT1 are fed to the respective inputs of networks $R_I$ and $R_{II}$.

The systems operate exactly as described above. Of course, if an input voltage is fed to one only of the variators C*b*, C*c*, C*d* at a time, the system will operate as though it were provided only with the corresponding variator, i.e. as described with reference to Figs. I–5, I–17 and I–20, as the case may be.

Fig. I–25 shows a further embodiment of the X variator for function generators using alternating voltage V*e*, having a frequency of for example 50 cycles. This type of variator essentially comprises a device known as a synchro detector, having coaxial rotor and stator. Rotor 24 comprises a coil fed by input voltage V*e*. The stator comprises three Y connected coils 21, 22 and 23, shifted by 60° with respect to each other, and providing three elementary voltages V*m*1, V*m*2 or V*m*3 respectively.

The mode of operation of synchro-detectors is well known. The respective windings of stator coils 21, 22, 23 are so wound that the voltages collected at their respective outputs vary as a function of the angular position of rotor 24, as shown in Fig. I–2.

Fig. I–26 shows another embodiment of the Function Generator having three Variators C*e*, C*f*, and C*g*, one switcher A*e* and two Networks $R'_I$ and $R'_{II}$. It is fed with alternative input voltage, having a frequency preferably of the order of 500 kcs. In this embodiment use is made of the calculating circuits described in the U.S. Patent 2,785,853.

Each variator essentially comprises a variable condenser, of a somewhat particular type. The stator of condenser C*e* comprises a hollow cylinder of insulating material having on its inner surface six conductive areas 1*a*, 1*b*, 2*a*, 2*b*, 3*a*, 3*b*, separated from each other by insulated straight parallel lines, approximately one millimeter wide, and extending respectively along the whole length of generatrices of the cylinder. The stators of condensers C*f* and C*g* are identical and have respective conductive areas 1'*a*, 1'*b*, 2'*a*, 2'*b*, 3'*a*, 3'*b* and 1''*a*, 1''*b*, 2''*a*, 2''*b*, 3''*a*, 3''*b*.

Each rotor is rotatably mounted inside the corresponding stator. The axes of the three rotors are tied together for simultaneous rotation. These rotors are made of insulating material, and their respective surfaces comprise two conductive areas, 36*a* and 36*b*, 36'*a* and 36'*b*, 36''*a* and 36''*b* respectively, separated from each other in the same way as those of the stators, except that the separation lines are curves.

Designating for instance C(1*a*/36*a*) the capacity between the cooperating conductive areas 1*a* and 36*a* and by $C_0$ a constant capacity, $\varphi$ $(\theta)$ being the same function as above, these curves are such that the following relations may be written for variators C*d*, C*f* and C*e*, respectively:

$$C(1a/36a)=C(1b/36b)=C_0[1+\varphi(\theta)]$$

$$C(1b/36a)=C(1a/36b)=C_0[1-\varphi(\theta)]$$

$$C(1'a/36'a)=C(1'b/36'b)=C_0\left[1+\frac{d\varphi}{d\theta}\right]$$

$$C(1'b/36'b)=C(1'a/36'b)=C_0\left[1-\frac{d\varphi}{d\theta}\right]$$

$$C(1''a/36''a)=C(1''b/36''b)C_0\left[1+\frac{d^2\varphi}{d\theta^2}\right]$$

$$C(1''a/36''b)=C(1''a/36''b)-C_0\left[1-\frac{d^2\varphi}{d\theta^2}\right]$$

Areas 36*a* and 36*b*, 36'*a* and 36'*b*, 36''*a* and 36''*b* are brought respectively to alternating potentials of opposite phase, $\pm Ve/2$, $\pm V'e/2$, $\pm V''e/2$, by means of three high frequency sources S, S', S'' of same frequency and phase, respectively feeding three coils L, L', L'' having their output terminals respectively connected to the two areas of each rotor. Of course a single input voltage could be used.

Areas 1*a* and 1*b*, 1'*a* and 1'*b*, 1''*a*, and 1''*b* are connected, respectively, to input terminals of a quadripole 211. Likewise, areas 2*a*, 2*b*, 2'*a*, 2'*b*, 2''*a*, 2''*b* are connected to a quadripole 212, and areas, 2*a*, 3*b*, 3'*a*, 3'*b*, 3''*a*, 3''*b* to a quadripole 213.

Quadripole 211 comprises two identical capacitors $C_{11}$, $C'_{11}$ and coils $L_{11}$ and $L'_{11}$ connected as shown in the Fig. I–26. Quadripoles 212 and 213 are identical to quadripole 211.

This provides, for instance as relates to voltage V*m*1, the diagram of Fig. I–27 in which the various elements from the diagram I–25 have been indicated by the same references. If the respective inductance and capacity values are selected in accordance with the teaching of the above mentioned patent, the diagram of Fig. I–27 appears to be the adding and multiplying circuit disclosed in that application. The same is true for quadripoles 212 and 213 and the circuits connected thereto.

Thus the following voltages are obtained as outputs of variator C*e*:

$$Vm1=Ve\varphi(\theta)+V'o\varphi'(\theta)+W''e\varphi(\theta)$$

$$Vm2=Ve\varphi\left(\theta+\frac{\pi}{3}\right)+V'e\varphi'\left(\theta+\frac{\pi}{3}\right)+V''e\varphi''\left(\theta+\frac{\pi}{3}\right)$$

$$Vm3=Ve\varphi\left(\theta+\frac{2\pi}{3}\right)+V'e\varphi'\left(\theta+\frac{2\pi}{3}\right)+W''e\varphi''\left(\theta+\frac{2\pi}{3}\right)$$

It is quite obvious that similar results would be obtained for variators C*f* and C*g*.

The switcher shown in Fig. I–26 will now be described. It is derived from that shown in Fig. I–11 by duplication of contact plates since alternating voltages of opposite phase are used. There are six pairs of variable elementary voltage contact plates 1103'—1103'' to 1108'—1108'', six pairs of constant elementary voltage plates 1011'—1011'' to 1013'—1013'' and 1021'—1021'' to 1023'—1023'' and nine pairs of brushes 101'—301'' to 309'—309'', each pair being arranged to be in constant sliding contact with two plates belonging to the same pair of plates.

The plates are arranged in three concentric rows, in the same way as in Fig. I–11 on a supporting insulating plate 100*b*.

The plates are fed in the same way as Fig. I–11, the two plates of one pair being respectively connected to the two corresponding A.C. terminals, which provide original voltages, constant or variable, as the case may be.

The switcher and variators have their respective rotations tied as explained above by means of any suitable device D. Elementary voltages VT1 to VT9 are collected across brushes 301'—301'' to 309'—309'', the potentials of the brushes of a same pair being always equal and opposite in phase.

Considering for instance the brush pair 301'—301'', when switcher A*e* rotates, brush 301' sweeps successively plates 1011'—1103'—1021'—1106' and brush 301'' sweeps successively plates 1011''—1103''—1021''—1106''. Accordingly the voltages $-Ve$, V*m*1, $+Ve$ are collected across brushes 301' and 301''.

The function generator thus generates periodic functions having a period of $2n=18$.

Input voltages V*e* and the elementary voltages VT1 . . . VT9 are fed in parallel to two adding network $R'_I$ and $R'_{II}$ in the same way is in Fig. I–11. Each network $R'_I$ or $R'_{II}$, comprises input quadripoles C0 to C9 or D0 to D9 and one output quadripole 214 or 215 having two coils $L_{14}$ and $L'_{14}$ and two condensers $C_{14}$ and $C'_{14}$. One of these networks is diagrammatically shown, in part in Fig. I–28. As may be readily seen, it is a calculator network of the multiplying and adding type described in the above mentioned patent. Each quadripole C0 through C9 comprises a variable condenser providing four variable capacities, 216 through 219, as described in the above mentioned patent These quadripoles are fed from brushes 301'—301'' to 309'—309'' through their respective coils $L_{16}$. Same voltages are fed to the corresponding quadripoles of network $R'_{II}$.

At the output of networks $R'_I$ or $R'_{II}$ voltages $Vs_1$ and $Vs_2$ are collected, in the same way as above. The various elementary function coefficients are obtained by adjusting the variable condensers of circuits C0 to C9 and D0 to D9. The final result is the same as in the case of Figs. I–23 and I–24.

Fig. I–29 shows a block diagram of a further embodiment of the function generator according to the invention. It comprises two variators C*h* and C*i* feeding a switcher A1 and a variator $Cj$ feeding a switcher A2. The elementary voltages derived from these two switchers are summed up by two networks $R_I$ and $R_{II}$.

Variators $Ch$ and $Ci$ may, for instance, be identical to the variator shown in Fig. I–25. They are controlled by the same shaft and switcher A1 is tied to this shaft through a reducing gear D2. Variator $Cj$ may be of the same type and is controlled by another shaft which drives switcher A2 through a gear device D2.

The addition of original voltages from variators $Ch$ and $Ci$ is performed by means of the same connecting units as in Fig. I–24. Switcher A1 thus receives three original variable voltages:

$$U_1m1=V_1m1+V'_1m1$$

$$U_1m2=V_1m2+V'_1m2$$

$$U_1m3=V_1m3+V'_1m3$$

and two original constant voltages $Va$ and $Vb$. Likewise, variator $Cj$ supplies to switcher A2 variable original voltages: $U_2m1$, $U_2m2$ and $U_2m3$.

Adder circuits T1, T2, T3, identical to that shown in Fig. I–27 and connected as shown, sum up elementary voltages generated by Switchers A1 and A2 to feed the resulting voltage to networks $R_I$ and $R_{II}$. If these networks are arranged to provide adequate coefficients, voltages $V_{sI}$ and $V_{sII}$, collected at their respective outputs are:

$$V_{sI}=V_1.F(X_1)+V'_1.F'(X_1)+V_2.F(X_2)$$

$$V_{sII}=V_1.G(X_1)+V'_1.D'(X_1)+V_2.G(X_2)$$

E—SECOND EMBODIMENT OF THE FUNCTION GENERATOR

In the embodiments of the variator described so far use has been made, on the one hand, of functions $h_3(X)$ and $h_3(X+\Delta X)$ and, on the other hand, of functions $-h_3(X)$ and $-h_3(X+\Delta X)$, i.e. of functions where curves are symmetrical with respect to the curves of the former functions.

This results in continuous variable original voltages, the period corresponding to one revolution of the shaft being $2n$.

In the embodiment to be described hereinafter only functions $h_3(X)$ and $h_3(X+\Delta X)$ will be used. This results in discontinuous original voltages of a periodicity which corresponds to one revolution of the driving shaft.

This modification of the Function generator comprises broadly the same three main components as shown in Fig. I–1, namely a variator $Ca$, a switcher $Aa$ and a network $Ra$.

Input voltage $Ve$ is applied to variator $Ca$ which provides, as above, two constant original voltages $Va$ and $Vb$, and $n$ variable original voltages $Vm1$, $Vm2$ . . . $Vmn$. The respective values of these voltages depend, as above, on both $Ve$ and on the angular position $\theta$ of the shaft driving the variator. The angular position of the variator shaft is defined as a function of X by the relation $$\theta=\frac{2\pi}{n}(X-1)$$

The variators may again be of two basic types. The following Table I applies to the first type:

*Table I*

[Values of $Vmp$ as a function of X]

| When X varies from— | to— | $Vmp$ |
|---|---|---|
| $p-k$ | $p+k$ | $=Va$ |
| $p+k$ | $n+p-k$ | varies from $Va$ to $Vb$ |
| $n+p-k$ | $n+p$ | $=Vb$ |
| $n+p$ | $n+p+k$ | $=Va$ |
| $n+p+k$ | $2n+p-k$ | varies from $Va$ to $Vb$ |
| $2n+p-k$ | $2n+p$ | $=Vb$ |
| $2n+p$ | $2n+p+k$ | $=Va$ |

In this table $p$ designates the rank of the variable original voltage, $k$ a small number value equal, for example, to 0.1, and which is one half the commutation or switching angle of the variator, as will be shown later.

Fig. II–1 shows the curves of original voltages $Vm1$, $Vm2$, $Vm3$ provided in this case. It is apparent from this figure that these voltages are periodical functions of X, with a period $n=3$, and that they are phase shifted with respect to each other and have a discontinuity for $X=p$, $X=p+n$, $X=p+2n$ etc.

If, for example $Vm1$ is considered, it is seen that it varies from $Va$ to $Vb$, when X varies from $1+k$ to $4-k$, from $4+k$ to $7-k$ and so on . . . and displays a discontinuity for the values 4, 7 . . . for which voltage $Vm1$ is switched from $Vb$ to $Va$. This discontinuity is due to the particular arrangement of the variator, used in the present instance, which provides for an appropriate interval $d$, having an opening angle $2\epsilon$, at the moment $Vm1$ is switched from $Vb$ to $Va$.

The following Table II applies to the second type of variator:

*Table II*

| When X varies from— | to— | $Vmp$ |
|---|---|---|
| $p-k$ | $p+k$ | $=0$ |
| $p+k$ | $n+p-k$ | raises to a maximum and returns to 0 |
| $n+p-k$ | $n+p+k$ | $=0$ |
| $n+p+k$ | $2n+p-k$ | raises to a maximum and returns to 0 |
| $2n+p-k$ | $2n+p+k$ | $=0$ |

The corresponding original voltage curves are shown in Fig. II–11.

These voltages are fed to switcher $Ac$ which is tied to the variator through a reduction gear as explained above. Switcher $Ac$ provides elementary voltages according to the following Table III:

*Table III*

VT1:
- For $X<1$ ---------- VT1 is equal to $Va$.
- For X comprised between 1 and $n+1$ -- VT1 is equal to $Vm1$.
- For $X>n+1$ -------- VT1 is equal to $Vb$.

VT2:
- For $X<2$ ---------- VT2 is equal to $Va$.
- For X comprised between 2 and $n+2$ -- VT2 is equal to $Vm2$.
- For $X>n+2$ -------- VT2 is equal to $Vb$.

And so on, up to VT$n$ inclusive.

$VT(n+1)$:
- For $X<n+1$ -------- $VT(n+1)$ is equal to $Va$.
- For X comprised between $n+1$ and $2n+1$ ---------- $VT(n+1)$ is equal to $Vm1$.
- For $X>2n+1$ ------- $VT(n+1)$ is equal to $Vb$.

And so on, up to VT$2n$ inclusive.

$VT(2n+1)$:
- For $X<2n+1$ ------- $VT(2n+1)$ is equal to $Va$.
- For X comprised between $2n+1$ and $3n+1$ ---------- $VT(2n+1)$ is equal to $Vm1$.
- For $X>3n+1$ ------- $VT(2n+1)$ is equal to $Vb$.

And so on, up to VT$3n$.

Fig. II–2 shows the curves of elementary voltages VT1 . . . VT9 supplied by switcher $Ac$ starting from the three variable original voltages $Vm1$, $Vm2$, $Vm3$ and from the two constant original voltages $Va$ and $Vb$.

As may be readily seen, VT1 is a function of X equal to $Va$ for any value of X lower than 1 is equal to $Vm1$ for $1<X<4$, and is equal to $Vb$ for $X>4$.

Since elementary functions must be "smoothed" functions of X, when the switcher passes from $Va$ to $Vm1$, or from $Vm1$ to $Vb$, $Vm1$ must be equal to $Va$ or to $Vb$, as the case may be.

Network Rc affects the elementary voltage functions with suitable coefficients to provide an output voltage $Vs$ which simulates function $y=F(X)$, all that in the same way as described above.

Fig. II–3 shows an embodiment of the function generator wherein use is made of discontinuous original voltages as just described. It comprises a variator $Cm$, operating on a direct current supply and comprising a potentiometer 35, having a circular winding 36, fed through two contacts 37 and 38.

Potentiometer 35 comprises three movable contacts 31, 32, 33 secured on a shaft 34, the angular position $\theta$ of which is defined by the opening angle of the potentiometer sector comprised between contacts 37 or 38, and computed in the direction indicated by the arrow. The three movable contacts are stationary with respect to each other and the angle between two adjacent contacts is equal to $2\pi/n$ i.e. in the present instance to $2\pi/3$.

The winding of potentiometer 35 is wound in accordance with the following relation:

$$r(\theta)=r_0[1+\varphi(\theta)]$$

where $r(\theta)$ designates the resistance of the winding portion comprised between contact 8 and the point spaced therefrom by an angle $\theta$, $2r_0$ the resistance of the whole potentiometer winding 36 and $\varphi(\theta)$ a function "smoothed" to the second degree, which is precisely the function $h_3(X)$, discussed at the outset of this specification, with $$\theta=2\pi\frac{(X-1)}{8}$$

said function varying from $-1$ to $+1$, when $\theta$ varies from 0 to $2\pi$.

Each contact 37 and 38 extends over a small angular sector the opening angle of which $k\pi/3$ is the commutation angle, allowance being made for the interval $d$ defined above. It follows that $\varphi(\theta)$ remains equal to $-1$, or to $+1$, when $\theta$ deviates from 0, or from $\pi$, by an angle less than $k\pi/3$.

A source supplies input voltage $Ve$, through unit 9 to contact 38, and through units 9 and 10 to contact 37. Thus, a negative voltage $Va$ is fed to input contact 38 and a positive voltage $Vb$ is fed to input contact 37. It may be assumed that:

$$Va=-Ve \text{ and } Vb=Ve$$

Contacts 31, 32, 33 are connected to units 11, 12 and 13, respectively, at the output of which respective voltages $-Vm1$, $-Vm2$ and $-Vm3$ are collected.

When $\theta$ varies from 0 to $2\pi$, movable contact 31 bears successively on contact 38, winding 36 and contact 37. Voltage $Vm1$ supplied thereby is equal to $-Va$ when contact 31 engages contact 38, i.e. when $\theta$ is lower than $k2\pi/3$; is equal to $Ve\varphi(\theta)$ while contact 31 runs over winding 36, i.e. as long as $\theta$ is comprised between $k2\pi/3$ and $2\pi-k2\pi/3$; and is equal to $Vb$ when contact 31 bears on contact 37, i.e. when $\theta$ is comprised between $2\pi-k2\pi/3$ and $2\pi$.

Each movable contact must have left contact 37 before reaching contact 38, to avoid any short-circuit between contacts 37 and 38. The angular distance between these two contacts is equal to $2\epsilon.2\pi/3$, as shown in Fig. II–4, $2\epsilon$ being preferably slightly greater than the angular opening of a movable contact.

Switcher $Am$ of the function generator shown in Fig. II–3 comprises an insulating plate, shaped as a rectangular strip 30. This strip supports two rectangular contact plates 39 and 40 in prolongation of each other and three smaller rectangular contact plates 41, 42, 43 positioned between plates 34 and 40, as shown in Fig. II–3.

Plates 39 and 40 are brought to constant original potentials $Va$ and $Vb$ respectively, and plates 41, 42, 43 to variable original potentials $Vm1$, $Vm2$ and $Vm3$, respectively, in the same way as in Fig. I–7.

Stationary brushes 301 to 309 are disposed in such a way that each one is in slidable contact with two constant original voltage plates and one of the variable original voltage plates, as shown in Fig. II–3, when strip 30 moves lengthwise. Their breadth is such that when, for instance, brush 301 passes from plate 40 to plate 41, it contacts plate 41 before breaking contact with plate 40. The brushes are disposed in such a manner that when strip 30 moves in the direction of the arrow, Brush 301 successively gets into contact with plates 40, 41, 39

Brush 302 successively gets into contact with plates 40, 42, 39

Brush 303 successively gets into contact with plates 40, 43, 39

Brush 304 successively gets into contact with plates 40, 41, 39

Brush 305 successively gets into contact with plates 40, 42, 39

Brush 306 successively gets into contact with plates 40, 43, 39

Brush 307 successively gets into contact with plates 40, 41, 39

Brush 308 successively gets into contact with plates 40, 42, 39

Brush 309 successively gets into contact with plates 40, 43, 39

The brushes are spaced from each other, lengthwise of strip 30, by a distance taken as a unit of length. The added length of two plates 39 and of one of the plates 41, 42 or 43 is equal to $n$ units, with $n=3$ in the present case.

As in the case of Fig. I–7 means are provided for tying the angular displacements of movable contacts 31, 32, 33 and the linear displacement of strip 30 in such a way that the latter affects a translation of X units in the direction of the arrow when movable contacts are rotated by $X.2\pi/n$ radians, i.e. in such a way that, when one of brushes 301 to 309 engages two contact plates, the position of movable contacts 31, 32, 33 is such that the two short circuited contact plates are at the same potential.

For a better understanding of the operation of the function generator shown in Fig. II–3 reference will be made to Figs. II–5 and II–6. In Fig. II–5 brush 301 has just left contact plate 41 and engages plate 40, while brush 304 is in contact with plate 39 which it is about to leave to engage contact plate 41. Variator movable contact 31 has at that time left fixed contact 37 and is engaged into gap $d$. Accordingly, plate 41 has just abandoned potential $Vb$ and is about to be switched to potential $Va$. At the moment the Switcher brushes are in the position shown in Fig. II–6, i.e. at the moment brush 301 has advanced over plate 40 and brush 304 simultaneously engages plates 41 and 42, movable contact 31 must have rotated by an angle $2\epsilon$ and have reached fixed contact 38. Consequently the translation of a switcher brush over the gap separating plates 41, 42 and 43 from plate 39 or 40, must be effected simultaneously with the translation of a movable contact from fixed contact 37 to fixed contact 38.

As may be readily seen, when a switcher brush leaves a constant original voltage plate for a variable original voltage plate, the two short-circuited plates are at the same potential, $Vm1$ being at that moment equal to $Va$. When brush 304 has left plate 31 for plate 41 the potential $Vm1$ of this plate gradually raises from voltage $Va$ to $Vb$ and so does voltage VT1, provided by brush 304.

When brush 301 has left plate 41 for plate 40, voltage VT1 passes from voltage V*m*1 to voltage V*b*, these voltages being equal at that instant as just explained and, as long as brush 301 engages plate 102, voltage VT1 remains equal to V*b*. The above procedure is clearly apparent from Figs. II–7 and II–8, showing variable and elementary voltage curves respectively.

The Function Generator of Fig. II–3 also comprises a Network, having resistances $R_1, R_2 \ldots R_9$, to which are respectively fed elementary voltages VT1 . . . VT9, and resistance $R_0$ which receives input voltage V*e*, all in the same way as in the embodiment of Fig. I–7. Resistances $R_1 \ldots R_9$ may be connected to output amplifier $A_2$ either directly or through two-way contactors E0 to E9, by means of an inverter unit 44 of already mentioned type. Output voltage V*s* is collected at the output of amplifier $A_2$. The operation of this Network is entirely identical to that of the network used in Fig. I–7.

Same functions as those generated by the system of Fig. I–7 may be generated by the function generator just described, as for instance the functions of Figs. I–14 to I–16.

Of course the switcher shown in Fig. I–11 can also be used in the function generator of Fig. II–3. In this case contact plates 1011 to 1013 are raised to potential V*b*, contact plates 1021 to 1023 to potential V*a*, contact plates 1103 to 1105 to the respective poteentials V*m*1, V*m*2, V*m*3 and contact plates 1106 to 1108 to potentials —V*m*1, —V*m*2, —V*m*3.

Brushes belonging to each set of brushes 301, 302, 303 or 304, 305, 306 or 307, 308, 309 are spaced from one another by an angle $\theta_1 = \pi/9$, i.e. an angle corresponding to $X=1$.

Brush 301 is spaced from brush 304 by the angular distance $\pi - \pi/9$, i.e. $8\pi/9$, the same being true for brushes 301 and 307 and brushes 304 and 307. The angular opening of the variable original voltage plates is equal to $n-2k$ units i.e. $3-2k$ units in the present instance. The angular opening of the constant original voltage plates is 6 units. The reduction ratio of the gear device D is $n/2N$.

With the above Switcher the Function Generator of Fig. II–3 provides periodic functions. The variable original voltages shown in Fig. II–7 are identical to those of Fig. II–2. However, the elementary voltages display curves different from those in Fig. II–2. They are shown in Fig. II–8. Functions shown in Figs. I–14 to I–16 may thus be provided.

Fig. II–9 shows a variator which stays in the same relationship to the variator of Fig. II–3 as the variator of Fig. I–17 to that shown in Fig. I–7. In other words constant original voltages V*a* and V*b* are made equal to zero.

This variator comprises a potentiometer 55, the winding of which comprises two identical portions 56*a* and 56*b*, separated by contacts 57 and 58. Contact 57 is grounded and contact 58 is brought to potential V*e* by means of unit 9. Three movable contacts 51, 52 and 53 are secured on a shaft 4. Upon rotation of shaft 4 they engage successively winding portion 56*a*, contact 57, winding portion 56*b* and contact 58. The voltages collected by the movable contacts are fed to units 11, 12, 13 to provide original voltages —V'*m*1, —V'*m*2, —V'*m*3. The winding law is the same as in the case of Fig. I–17, i.e.

$$r(\theta) = r_0 \frac{d\varphi}{d\theta}$$

$2r_0$ being the resistance of the potentiometer winding, $r(\theta)$ the resistance of the winding portion comprised between fixed contact 58 and movable 51, and $\theta$ the function defined above. This function is preferably smoothed up to the first order. It is equal to 0 for $\theta=0$, to 1 for $\theta=\pi$, to 0 for $\theta=2\pi$.

As in the case of Figs. II–3 and II–4 each contact 51 or 58 covers a sector the opening angle of which is $k\pi/3$;

$$X = 1 + \frac{\theta}{2\pi/3}$$

being the variable original voltage V'*m*1, shown in Fig. II–10 is obtained. Voltage V'*m*2 and V'*m*3 curves are obtained by laterally shifting voltage V*m*1 curve by $\Delta X$ values equal to 1 and 2 respectively.

Fig. II–11 shows nine elementary voltages V'T1 to V'T9 curves which are derived from Fig. II–10 as voltage curves of Fig. I–19 are derived from Fig. I–18, when Variator of Fig. II–9 is used in the function generator of Fig. II–3. As in the case of variator of Fig. I–17, it will be readily seen that voltages V'T1 . . . V'T9 are the respective derivatives of voltages VT1 . . . VT9 with respect to X, and the output of the function generator is: $V's = VeF'(X)$.

Fig. II–12 shows a variator enabling to obtain variable original voltages V''*m*1, V''*m*2, V''*m*3 which are the second derivatives with respect to X of the voltages shown in Fig. II–1. Potentiometer 65 comprises three linear portions 66*a*, 66*b*, 66*c* separated by three contacts 67, 68*a* and 68*b*. Contact 67 is grounded and contacts 68*a* and 68*b* are brought to potentials +V*e* and —V*e*, respectively, by means of units 9 and 10. The explanation is the same as above.

Figs. II–14 and II–14 show, respectively, the variation curves of the variable original voltage V''*m*1 and of the elementary voltage V''T1 obtained when variator of Fig. II–12 is used. In a similar way as above, the function generator output voltage is $V''s = Ve.F''(X)$.

Of course any of the combinations shown in Figs. I–23, I–24 and I–29 could be realized also in this case. Also, the variation shown in Fig. I–25 may of course be used.

Fig. II–15 illustrates in part an embodiment of a function generator which corresponds to the embodiment shown in Fig. I–26. The switcher and the network are identical in both cases. Variator C*e* is also the same in both embodiments. However, additional means are provided to make discontinuous the continuous periodical original voltages provided by variator C*e*. This means may, for instance, comprise an inverter. Inverter 78, shown in Fig. II–15, comprises six conductive plates 90 to 95, insulated from each other and concentrically disposed in three rows as shown, on an insulating plate 96 rotatably supported on a shaft 79.

Plates 90 to 95 are respectively connected to the six outputs of variator C*e* and brushes 80 to 85 are connected to the six inputs of quadripoles 211 to 213 in such a way that inverter 78 is in fact inserted between variator C*e* and switcher A*e* of Fig. I–26.

F. THIRD EMBODIMENT OF THE FUNCTION GENERATOR

All the embodiments of the function generator so far described comprise an output amplifier $A_2$ which supplies an output voltage V*s*, proportional to the intensity of the current I*s* fed thereto. The very purpose of the function generator is to feed to amplifier $A_2$ a current I*s*, such that the ratio $Is/Ve$ is proportional to the function F(X).

Theory and practice show that, provided all the amplifiers it contains are reversed or removed, the function generator may itself be reversed: its input, which in the embodiments described so far was connected to the source providing voltage V*e*, now becomes its output and is connected to amplifier $A_2$, whereas its output, which previously was connected to amplifier $A_2$, becomes its input and is connected to the source. This is true for all the embodiments described so far.

Fig. III–1 is a block diagram of a function generator according to this third embodiment.

The network R'*a* is identical to those used in the first and second embodiments, provided:

(*a*) that the output device, such as amplifier $A_2$ which is adapted in the first and second embodiments to supply a voltage $V_s$, proportional to the intensity of the current fed thereto is eliminated;

(b) that all the connecting amplifier units it contains are reversed;

(c) that the input source is connected in lieu of the above output device.

In other words, the network comprises, as before, $N+1$ adjustable impedances or more generally, $N+1$ adjustable parameter circuits. One thereof is connected between the input of the function generator and a first output of the network and the N other impedances are respectively connected between the same input and the N, for instance 9, other outputs of the network. The network thus supplies N currents:

$$R_1 Ii1 = Ve$$
$$R_2 Ii2 = Ve$$
$$\vdots$$
$$R_N IiN = Ve$$

and an additional current $Io$. These currents, termed initial currents, are respectively proportional to the impedances comprised in the network, or more generally to the variable parameters of the circuits the network comprises, the various coefficients A being represented, in the same way as above, by the respective impedances $R_1$ to $R_N$ of this network or by the respective variable parameters it comprises. Negative coefficients are obtained by means of any known sign reversing device, such as transformers, amplifiers, etc.

The switcher is identical to those used in the first and second embodiments of the function generators, it being understood that its input becomes its output, and vice versa. It receives the N initial currents supplied by the network and for each position of its brushes it delivers:

(a) $n$ currents which are fed to the movable contacts of the variator, with N being a multiple of $n$, and, for instance equal to 3;

(b) two currents of respective intensities $Ia$ and $Ib$, each equal to the sum of certain of the $N-n$ remaining initial currents, which are fed to the output directly and through an inverter unit, respectively; the sum $Ia+Ib$ is equal to the sum of these remaining currents.

The variator is of any suitable type among those used in the first and second embodiments, provided:

(a) that the output device such as amplifier $A_2$ is connected where the source of voltage $Ve$ was previously connected;

(b) that the amplifiers which it may include are reversed with respect to the two first embodiments.

Elementary currents IT which correspond respectively to elementary functions $Af(X)$ are thus fed to the input of the output amplifier $A_2$. The sum $Ie$ of these currents is equal to $A_1\ IT1 + A_2\ IT2 + \ldots A_N ITN$ and a voltage $Ve$ is collected at the output of the output amplifier.

The operation of this embodiment of the function generator will be better understood from Fig. III–2 in which same references have been used to designate same elements as in Fig. I–7. Connecting units 11, 12, 13, 14 have been omitted and unit 9 is reduced to an amplifier at the output of which voltage $Vs$ is collected.

Voltage $Ve$ is fed to the input of network $Rb$ and current $Io$ and the nine initial currents $Ii1$ to $Ii9$ are fed to the switcher.

For any position of the switcher and of the variator, brushes 118 to 126, (a) either engage a constant original voltage plate,
(b) or engage a variable original voltage plate,
(c) or engage two plates, one of each type.

The three cases will be considered successively hereinafter:

(a) This is the case of brushes 121 to 126 in Fig. III–2. Brushes 121, 122 and 125 are in contact with plate 103. Currents flowing from resistances R4, R5 and R6 are fed directly to the input of the output circuit 9. Brushes 124, 125 and 126 are in contact with plate 104 and currents flowing from resistances R7, R8, R9 are fed through inverter unit 10, to the same input of device 9.

Respective input impedances of circuits 9 and 10 must be small with respect to resistances R0 to R9. Total current fed to the input of units 9 is $$I_p = Ii4 + Ii5 + Ii6 - (Ii7 + Ii8 + Ii9)$$

Thus currents $Ii4$, $Ii5$, $Ii6$ are multiplied by $+1$ and currents $Ii7$, $Ii8$, $Ii9$ by $-1$.

(b) This is the case of brushes 118 and 119. Accordingly, currents $Ii1$ and $Ii2$ are fed to movable contacts 1 and 2, respectively. The winding of potentiometer 5 must have a resistance which is negligible with respect to resistances R0 to R9, while being high as compared to the input impedance of amplifier 10. In the patent application, filed in France, April 12, 1956, for "A New Potentiometer Device" it has been shown that, if X is the angular position of the shaft which carries movable contacts 1, 2 and 3, a current is collected at the output of the variator, which is the sum of three currents equal to $Ii1\varphi(\theta)$, $Ii2\varphi(\theta+\pi/3)$ and $I13\varphi(\theta+2\pi/3)$.

(c) This is the case of brush 120. As described above, in this position of the switcher brushes, movable contact 3 connected to plate 107 is in contact with tap 8. The gap between the variable and original voltage plates and the angular opening of taps 7 or 8 are selected in such a way that this contact persists as long as brush 120 is simultaneously engaging the two plates. The current flowing through brush 120 is thus divided into two portions one of which is fed to tap 8 through plate 104, and the other to contact 8 through plate 107 and movable contact 3.

It is thus readily seen that, according to the respective positions of the switcher brushes and of the variator movable contacts, each current, when reaching the input of the output device $A_2$ is multiplied by a coefficient which is either $+1$, or $-1$ or $\varphi(\theta)$, or $\varphi(\theta+\pi/3)$ . . . thus providing the elementary currents. Accordingly, the output voltage is of the form:

$$V_s = V_e[A_0 + A_1 f_1(X) \ldots A_N f_N(X)]$$

where $A_1 f_1(X) \ldots A_N f_N(X)$ are the function defined above.

Fig. III–3 illustrates another embodiment of the function generator which is of the same type as the generator shown in Fig. I–26 and, except for the feature just explained, operates in the same way. Same references are used in both figures. Structurally both embodiments are identical, except that voltage $Vs$ is in this case fed to the network through coil L and output voltage $Ve$ is collected through quadripole 214 at the output of the variator, while the reverse was true in the case of Fig. I–26.

G. FOURTH EMBODIMENT OF THE FUNCTION GENERATOR

In a fourth embodiment of the function generator according to the invention, the ratio $Vs/Ve$ is equal to a function F (X,Y) of two variables X and Y, which are, for instance, respective functions of the angular position of two independent mechanical elements, such as shafts 4 and 4'.

Fig. IV–1 is a block diagram of such a function generator. It comprises essentially a function generator G1 of any type belonging to the first or the second embodiment described above and a function generator G3 belonging to the third embodiment described. Both have a common network Rc as is diagrammatically shown in Fig. IV–1.

Function generator G1 comprises: a variator $Ca$ which is driven by a shaft, the angular position of which is a function of the variable X; it receives an input voltage $Ve$ and supplies $n$ variable original voltages $Vm1$ . . .

$Vmn$, $n$ being for example equal to 3, and two constant original voltages $Va$ and $Vb$; a switcher $Aa$, identical to those already described in the first and second embodiments, tied to variator $Ca$ as described; it receives the original voltages supplied by the variator and supplies N elementary voltages VT1 . . . VTN, N being a multiple of $n$ and, for example, equal to 9.

Network $Rc$ which is common to both function generators G1 and G3 is diagrammatically shown in Fig. IV–2. It comprises $N'+1$ networks $Ra$, identical to those already described but having no output devices such as amplifier $A_2$ in the same way as in the third above described embodiment. Accordingly, network $Rc$ comprises $(N+1)\cdot(N'+1)=100$ adjustable impedances or, more generally, 100 adjustable parameter networks. As in the first and second embodiments, the input voltage $Ve$ and N elementary voltages VT1 . . . VTN are fed to each one of these $N'+1$ networks $Ra$ which are parallel connected. The first network thus supplies a current $Ii0$ and each one of the N′ other networks supplies an elementary intensity I11 to $IiN'$.

The second function generator comprises a switcher device $Aa$ driven by a shaft the angular position $\theta_Y$ of which is a function of the variable Y. It receives the N′ initial intensities $Ii1$ . . . $IiN'$, supplied by the N′ networks previously mentioned. Switcher $Aa$ and variator $Ca$ cooperate as described above, to provide an output voltage $V's$.

The function generator of this embodiment supplies at its output an output voltage $Vs=VeF(X,Y)$, X, Y being the two variables which are functions, respectively, of the angular positions $\theta_X$ and $\theta_Y$ of the two variator shafts. The various coefficients of function F are defined by the values of the adjustable impedances of network $Rc$, in the same way as described above.

At the output of network $Ra$ which simulates coefficients $A_{11}$ to $A_{1N}$ the following function is collected:

$$A_{11}f_1(X)+A_{12}f_2(X)\ .\ .\ .\ A_{1N}f_N(X)$$

In the same way, at the respective outputs of the $N'-1$ other networks $Ra$, the following functions are collected:

$$A_{21}f_1(X)+A_{22}f_2(X)+\ .\ .\ .\ A_{2N}f_N(X)$$
$$\vdots$$
$$A_{N'1}(X)+A_{N'2}f_2(X)+\ .\ .\ .\ A_{N'N}f_N(X)$$

or, more generally sums of functions of the type $$A_{pq}f_p(X)$$

$q$ ranging from 1 to N′ and $p$ from 1 to N.

Each of these function sums is multiplied by elementary functions $g_1(Y)$ to $g_{N'}(Y)$, provided by function generator G3.

The function collected at the output of variator $Ca$ of function generator G3 is of the shape:

$$\sum_{q=1,\ q=N}^{p=1,\ p=N} A_{pq}f_p(X)g_q(Y)$$

It is to be understood that the above described arrangements are illustrative of the application of the principles of the invention. Numerous other embodiments may be devised by those skilled in the art without departing from the spirit and scope of the invention.

What we claim is:

1. Electrical analog computing system for computing values of a function $y$ of at least one variable, say $y=F(X)$, within a predetermined interval of values of at least one of said variables, say X, only discrete values of $y$ being known, by equating function $y$ to the weighted sum $A_1f_1(X)+A_2f_2(X)+\ .\ .\ .\ A_Nf_N(X)$, said system comprising: a first and a second terminal circuit; means for feeding a predetermined input voltage to one of said terminal circuits and for collecting an output voltage from the other; two circuit means for providing two electrical magnitudes constant with respect to X; $n$ circuit means coupled to said first terminal circuit for providing from said input voltage $n$ electrical magnitudes, periodically varying with X between said two magnitude values constant with respect to X without mathematical discontinuity therewith, and phase shifted with respect to each other by a constant value of X; switching means coupled to said $n+2$ circuit means for switching to one of said terminal circuits N electrical magnitudes varying with X, each being equal, in successive predetermined intervals of variation of X without mathematical discontinuity, to one of said two constant electrical magnitudes, to one of said periodical magnitudes, to the other of said two constant electrical magnitudes, to provide elementary electrical functions respectively simulating said functions $f(X)$; N circuits, having parameters for respectively simulating said coefficients A, parallel coupled between said switching means and said second terminal circuit, for respective multiplication of said elementary electrical functions by said coefficients, $n$ and N being integers and multiples of each other.

2. Electrical analog computing system for computing values of a function of at least one variable, say $y=F(X)$, within a predetermined interval of values of at least one of said variables, say X, only discrete values of $y$ being known, by equating said function $y$ to the weighted sum $A_1f_1(X)+A_2f_2(X)\ .\ .\ .\ A_Nf_N$, said system comprising: an input circuit; means for feeding a predetermined voltage to said input circuit; two circuit means for providing two voltages constant with respect to X; $n$ circuit means coupled to said input circuit for providing from said voltage; $n$ voltages periodically varying with X between said two voltages without mathematical discontinuity therewith and for phase shifting said periodical voltages with respect to each other by a constant value of X; switching means having $n+2$ input means respectively coupled to said $n+2$ circuit means and N output means for providing respectively N voltage functions respectively comprising one of said constant voltages, a periodical portion of one of said periodical voltages and the other constant voltage to provide N elementary electrical functions respectively simulating said functions $f(X)$; N circuits having parameters respectively simulating said coefficients A and parallel connected respectively to said N outputs for multiplying respectively said N voltage functions by said coefficients; and a current summing output circuit for summing currents respectively fed thereto by said N circuits and providing an output voltage, N and $n$ being integers and multiples of each other.

3. Electrical analog computing system for computing values of a function $y$ of at least one variable, say $y=F(X)$, within a predetermined interval of values of at least one of said variables, say X, only discrete values of $y$ being known, by equating said function $y$ to $A_1f_1(X)+A_2f_2(X)\ .\ .\ .\ A_Nf_N(X)$ said system comprising: an input circuit; means for feeding a predetermined voltage to said circuit; N circuits having parameters for respectively simulating said coefficients A, parallel connected to said input circuit; a current summing output circuit; switching means having N input means respectively coupled to said N circuits and $n+2$ output means, and means for switching the current flowing from each of said N circuits in succession and without mathematical discontinuity therebetween to one of said two output means, to one of said $n$ output means and to the other of said two output means; said two output means being coupled for feeding currents flowing therethrough from said N circuits respectively to said current summing output circuit with an intensity constant with respect to X; circuit means having two output means coupled to said current summing output circuit and $n$ input means coupled to said $n$ output means for providing to said current summing circuit $n$ periodical currents having intensities varying as a function of X between two intensities, without mathematical discontinuity therewith and phase shifted with respect to each other by a constant value of X, to provide elementary current function simulating said elementary functions $Af(X)$; N and $n$ being integers and multiples of each other.

4. Electrical analog computing system for computing values of a function $y$ of at least one variable, say $y=F(X)$, within a predetermined interval of values of at least one of said variables, say X, only discrete values of $y$ being known, by equating said function $y$ to the weighted sum $A_1f_1(X)+A_2f_2(X)+ \ldots A_Nf_N(X)$, said system comprising: a first and a second terminal circuit; means for feeding a voltage to one of said terminal circuits; a variator circuit comprising two terminal means coupled to said first terminal circuit, $n$ other terminal means and variable parameter circuit means coupling said two terminal means and said $n$ terminal means respectively, said parameters being periodically variable with respect to X, between two values constant with respect to X, with a phase shift with respect to each other constant with respect to X; two circuits coupled to said first terminal circuit and having respectively said parameter values constant with respect to X; switching means having $n$ terminal means respectively coupled to said $n$ variator terminal means, two terminal means respectively coupled to said two circuits, N other terminal means, N and $n$ being integers and multiples of each other, and means for coupling in succession each of said N terminal means to one of said two circuits, to one of said $n$ terminal means, and to the other of said two circuits; N circuits having parameters for respectively simulating said various coefficients A, parallel connected between said N terminal means and said second terminal circuit; and means for collecting a voltage from the other terminal circuit.

5. Electrical analog computing system for computing values of a function Y of at least one variable, say $y=F(X)$, within a predetermined interval of values of at least one of said variables, say X, only discrete values of $y$ being known, by equating said function $y$ to the weighted sum $A_1f_1(X)+A_2f_2(X)+ \ldots A_Nf_N(X)$, and system comprising: a first and a second terminal circuit; means for feeding a voltage to one of said terminal circuits; a variator circuit comprising two terminal means coupled to said first terminal circuit, $n$ other terminal means and variable parameter circuit means respectively numbered from one to $n$, coupling said two terminal means and said $n$ terminal means respectively, said parameters being periodically variable with respect to X, between two parameter values constant with respect to X, with a phase shift with respect to each other constant with respect to X; two circuits coupled to said first terminal circuit and having respectively said parameter values; switching means having $n$ terminal means, respectively coupled to said $n$ variator terminal means, two terminal means respectively coupled to said two circuits, and N other terminal means, forming $p$ groups of $n$ terminal means respectively numbered from one to $n$, with N, $n$, and $p$, being integers; and means, for coupling in succession each of said N terminal means to one of said two circuits, to that one of said $n$ terminal means which has the same serial number and to the other of said two circuits, the variation cycle as a function of X of said parameters between their respective minimum and maximum values being the same as the coupling cycle of said terminal means of the same serial number to each other; N circuits having parameters for respectively simulating said various coefficients A, parallel connected between said N terminal means and said second circuit; and means for collecting a voltage from the other terminal circuit.

6. Electrical analog computing system for computing values of function $y$ of at least one variable, say $y=F(X)$, within a predetermined interval of values of at least one of said variables, say X, only discrete values of $y$ being known, by equating said function $y$ to the weighted sum $$A_1f_1(X)+A_2f_2(X)+ \ldots A_Nf_N(X)$$

said system comprising: a first and a second terminal circuit; means for feeding a voltage to one of said terminal circuits; a variator circuit comprising two terminal means coupled to said first terminal circuit, $n$ other terminal means and variable parameter circuit means respectively numbered from one to $n$ coupling said two terminal means and said $n$ terminal means respectively, said parameter of said circuit of serial number one being defined by a function $h_n(X)$, equal to $a$ for X=1, varying from $a$ to $b$ for $1<X<n+1$, and equal to $b$ for $X>n+1$, $a$ and $b$ being constant with respect to X, said parameter functions of said circuits of serial number 2 to $n$ being respectively shifted with respect to function $h_n(X)$ by $\Delta X$, $2\Delta X$ . . . $n\Delta X$ respectively, said function $h_n(X)$ being smoothed to the $(n-1)$th degree, two circuits coupled to said first terminal circuit and having respectively said parameter values $a$ and $b$; switching means having $n$ terminal means, respectively coupled to said $n$ variator terminals means, two terminal means respectively coupled to said two circuits, and N other terminal means, forming $p$ groups of $n$ terminal means respectively numbered from one to $n$, with N, $n$ and $p$ being integers, and means for coupling, in succession, each of said N terminal means to one of said two circuits, to that one of said $n$ terminal means which has the same serial number, and to the other of said two circuits, the variation cycle as a function of X of said parameters between their respective minimum and maximum values being the same as the coupling cycle of said terminal means of the same serial number to each other; N circuits having parameters for respectively simulating said various coefficients A, parallel connected between said N terminal means and said second circuit; and means for collecting a voltage from the other terminal circuit.

7. Electrical analog computing system for computing values of a function $y$ of at least one variable, say $y=F(X)$, within a predetermined interval of values of at least one of said variables, say X, only discrete values of $y$ being known, by equating said function $y$ to the weighted sum $$A_1f_1(X)+A_2f_2(X)+ \ldots A_Nf_N(X)$$

said system comprising: a first and a second terminal circuit; means for feeding a voltage to one of said terminal circuits; a variator circuit comprising two terminal means coupled to said first terminal circuit, $n$ other terminal means and variable parameter circuit means respectively numbered from one to $n$ coupling said two terminal means and said $n$ terminal means, respectively, said parameter of the circuit of serial number one being a continuous function of X of period $2n$ and equal to $h_n(X)$, which is equal to $a$, for $X=1$, varies from $a$ to $b$ for $1<X<n+1$ and is equal to $b$ for $X=n+1$, the sign of $h_n(X)$ changing after each interval equal to $n$, the respective parameter functions of the circuits of serial number 2 to $n$, being shifted from said parameter function of serial number one by $X=1$ to $X=n$ respectively, said function $h_n(X)$ being smoothed to the $(n-1)$th degree, $a$ and $b$ being constant with respect to X; two circuits coupled to said first terminal circuit and having respectively said parameter values $a$ and $b$; switching means having $n$ terminal means, respectively coupled to said $n$ variator terminal means, two terminal means respectively coupled to said two circuits, and N other terminal means forming $p$ groups of $n$ terminal means respectively numbered from one to $n$, with N, $n$ and $p$ being integers, and means for coupling, in succession, each of said N terminal means to one of said two circuits, to that one of said $n$ terminal means which has the same serial number, and to the other of said two circuits, the variation cycle as a function of X of said parameters between their respective minimum and maximum values being the same as the coupling cycle of said terminal means of the same serial number to each other; N circuits, having parameters for respectively simulating said various coefficients A, parallel connected between said N terminal means and said second circuit; and means for collecting a voltage from the other terminal circuit.

8. Electrical analog computing system for computing values of a function $y$ of at least one variable, say $y=F(X)$, within a predetermined interval of values of at least one of said variables, say X, only discrete values of $y$ being known, by equating said function $y$ to the weighted sum $A_1f_1(X)+A_2f_2(X)+ \ldots A_Nf_N(X)$, said system comprising: a first and a second terminal circuit; means for feeding a voltage to one of said terminal circuits; a variator circuit comprising two terminal means coupled to said first terminal circuit, $n$ other terminal means and variable parameter circuit means respectively numbered from one to $n$, coupling said two terminal means and said $n$ terminal means respectively, said parameter of the circuit of serial number one being a function of X having a period equal to $n$ and equal to a function $h_n(X)$, which is equal to $a$ for $X=1$, varies from $a$ to $b$ for $1<X<n+1$, $a$ and $b$ being constant with respect to X, and has a discontinuity for $X=1$, $X=2 \ldots X=n+1$, passing from $b$ to $a$ at these values of X, said parameter functions of circuits of serial number 2 to $n$ being shifted from said parameter function of serial number one by respective values 1, 2 . . . $n$; two circuits coupled to said first terminal circuit and having respectively said parameter values; switching means having $n$ terminal means, respectively coupled to said $n$ variator terminal means, two terminal means respectively coupled to said two circuits, and N other terminal means, forming $p$ groups of $n$ terminal means respectively numbered from one to $n$, with N, $n$ and $p$ being integers, and means for coupling, in succession, each of said N terminal to one of said two circuits, to that one of said $n$ terminal means which has the same serial number, and to the other of said two circuits, the variation cycle as a function of X of said parameters between their respective minimum and maximum values being the same as the coupling cycle of said terminal means of the same serial number to each other; N circuits, having parameters for respectively simulating said various coefficients A, parallel connected between said N terminal means and said second circuit; and means for collecting a voltage from the other terminal circuit.

9. A system according to claim 5, wherein said parameter function of said circuit of serial number one is a periodic function of X, is equal to zero for $X=1$, recedes from zero in the interval $1<X<n+1$, is equal to zero for $X=n+1$, recedes from zero in the interval $n+1<X<2n+1$, and so on.

10. A system according to claim 7, wherein said parameter is a periodic and continuous function of X, the period being equal to $X=2n$, the function relative to said circuit of serial number one being equal to zero for $X=1$, passing through a maximum in the interval $1<X<n+1$, being equal to zero for $X=n+1$, passing through a minimum in the interval $n+1<X<2n+1$, and so on, the maxima and the minima alternating after each interval equal to $n$.

11. A system according to claim 8, wherein said parameter varies as a periodic function of X, with a period $X=n$, the function relative to said circuit of serial number one passing through a maximum in the interval $1<X<n+1$, being equal to zero for $X=n+1$ and passing through a maximum in the interval $n+1<X<2n+1$ and so on.

12. A system according to claim 10, wherein said function relating to said circuit of serial number one is equal to $$\frac{dh_n}{dX}(X)$$

in the interval $$1<X<n+1, \text{ to} -\frac{dh_n}{dX}(X)$$

in the interval $n+1<X<2n+1$ and so on, the sign of $$\frac{dh_n}{dX}(X)$$

changing from one interval equal to $n$ to the adjacent one.

13. A system according to claim 11, wherein the function relating to said circuit of serial number one is equal to $$\frac{dh_n}{dX}(X)$$

in the interval $$1<X<n+1 \text{ and to} -\frac{dh_n}{dX}(X)$$

in the interval $n+1<X<2n+1$, and so on.

14. Electrical analog computing system for computing values of a function $y$ of at least one variable, say $y=F(X)$, within a predetermined interval of values of at least one of said variables, say X, only discrete values of $y$ being known, by equating said function $y$ to the weighted sum $A_1f_1(X)+A_2f_2(X)+ \ldots A_Nf_N(X)$, said system comprising: a first and a second terminal circuit; means for feeding a voltage to one of said terminal circuits; a variator circuit comprising two terminal means coupled to said first terminal circuit, $n$ other terminal means and variable parameter circuit means respectively numbered from one to $n$ coupling said two terminal means and said $n$ terminal means respectively, said parameters being periodically variable with respect to X between two parameter values constant with respect to X with a phase shift with respect to each other constant with respect to X, and a rotating shaft for varying said parameter X, the angular position of said shaft being a linear function of X, the variation of X by $q.n$, $q$ being an integer, corresponding to one revolution of said shaft; two circuits coupled to said first terminal circuit and having respectively said parameter values constant with respect to X; switching means having $n$ terminal means respectively coupled to said $n$ variator terminal means, two terminal means respectively coupled to said two circuits and N other terminal means, forming $p$ groups of $n$ terminal means respectively numbered from one to $n$, with N, $n$ and $p$ being integers, and means for coupling in succession each of said N terminal means to one of said two circuits, to that one of said $n$ terminal means which is of the same serial number and to the other of said two circuits, the variation cycle as a function of X of said parameters between their respective minimum and maximum values being the same as the coupling cycle of said terminal means of the same serial number to each other; N circuits, having parameters for respectively simulating said various coefficients A, parallel connected between said N terminal means and said second circuit; and means for collecting a voltage from the other terminal circuit.

15. A system according to claim 14, wherein the angular position $\theta$ of said shaft is related to said variable X through the equation $$\theta=\frac{\pi}{n}(X-1)$$

16. A system according to claim 14, wherein the angular position of said shaft is related to said variable X through the equation $$\theta=\frac{\pi}{2n}(X-1)$$

17. A system according to claim 14 further comprising a reduction gear coupled between said shaft and said coupling means of said switching means for actuating said means.

18. A system according to claim 17, wherein said switching means comprises $q$ pairs of plates, $q$ being defined by the equation $\Delta X=q.n$, $\Delta X$ corresponding to one revolution of said shaft, the plates of a same pair being positioned in the prolongation of each other and being spaced from each other by an interval, a group of $n$ plates positioned in said interval separating the two plates of the same pair, said plates pertaining to a same pair being respectively connected to said two circuits and said $n$ plates of each of said groups being respectively connected to said $n$ circuits of serial number one to $n$, all said plates being conductive and insulated from each other, and N brushes respectively coupled to said N circuits and spaced from each other by a length $l$, the length of said interval being equal to $n.l$ said reduction ratio being such that, upon rotation of said shaft by an angle $X=1$, said plates longitudinally advance by $l.\Delta X$, the various brushes being positioned for engaging in succession, upon variation of X, one plate of a pair of plates, one of said $n$ plates located between the two plates of said pair and the other plate of said pair.

19. A system according to claim 18, wherein one revolution of said shaft corresponds to an increase of $X$ by $\Delta X=2n$.

20. A system according to claim 18, wherein one revolution of said shaft corresponds to an increase of $X$ by $\Delta X=n$.

21. A system according to claim 17, wherein said switching means comprises two first groups of $n$ plates having the same angular opening, two second groups of plates having the same angular opening respectively separating said two first groups from each other, all said plates being disposed in concentric circular rows, the $n$ plates of each of said first groups being respectively connected to said $n$ circuits of serial number 1 to $n$ and the plates of each of said second groups being respectively connected to said two circuits which have said parameter constant with respect to X, $n$ groups of $N/n$ brushes respectively coupled to said N circuits and, within each of said groups, spaced by an angle $\theta_1$ from each other, one rotation of said shaft corresponding to $\Delta X=1$ causing said plates to rotate with respect to said brushes by $\theta_1.\Delta X$, the angular opening of said $n$ plates being $n.\theta_1$, the angular opening of said plates of said second groups being $2\pi-n\theta_1$, and each brush being positioned for engaging in succession, upon relative rotation of said plates and said brushes, one plate of one of said second groups, one plate of one of said first groups, the other plate of said second group, and one plate of the other of said first groups.

22. A system according to claim 21, wherein one revolution of said shaft corresponds to $X=2n$, said reduction ratio being $N/n$.

23. A system according to claim 21, wherein one revolution of said shaft corresponds to $\Delta X=n$, said reduction ratio being $2N/n$.

24. A system according to claim 21, wherein two plates and two brushes are substituted for each of said plates and brushes, the two plates resulting from each of these duplications being fed with voltages phase shifted by $\pi$, and said two brushes engaging respectively said two plates.

25. Electrical analog computing system for computing values of a function $y$ of at least one variable, say $y=F(X)$, within a predetermined interval of values of at least one of said variables, say X, only discrete values of $y$ being known, by equating said function $y$ to the weighted sum $A_1f_1(X)+A_2f_2(X)+ \ldots A_Nf_N(X)$, said system comprising: a first and a second terminal circuit; means for feeding a voltage to one of said terminal circuits; an inverter device; a potentiometer having a circular winding, $n$ movable contacts, each shifted with respect to the adjacent one by $\pi/2n$, and two terminals, diametrically spaced from each other and extending over a sector corresponding to an opening angle $k\pi/n$, $k$ being of the order of 0.1, and connected to said first terminal circuit, directly and through said inverter device respectively, said potentiometer being symmetrically wound with respect to the diameter passing through said two terminals; a rotary shaft carrying said movable contacts, the winding of the potentiometer being wound in accordance with the law expressed by $$r(\theta)=r_0[1+\varphi(\theta)]$$

wherein $r(\theta)$ is the resistance of the winding portion comprised between one of said two terminals and the point angularly spaced therefrom by an angle $\theta$, $\theta$ being equal to $$\frac{\pi}{2n}(X-1)$$

$r_0$ is half the resistance of said winding portion comprised between said two terminals, $\varphi(\theta)$ is for $1<X<n+1$, equal to a function $h_n(X)$ which is smoothed to the $(n-1)$th degree and varies from $-1$ to $+1$ when $\theta$ varies from zero to $\pi$; $n$ circuit means respectively coupled to said $n$ movable contacts; switching means respectively numbered from one to $n$ having $n$ terminal means respectively to said $n$ circuits, two terminals respectively coupled to said two terminals, N other terminal means, forming $p$ groups of $n$ terminal means respectively numbered from one to $n'$, with N, $n$ and $p$ being integers, and means, operable by said shaft, for coupling in succession each of said N other contacts to one of said two terminals, to one of said $n$ terminal means of the same serial number, and to the other of said two terminals, the variation cycle of $\varphi(\theta)$ between $-1$ and $+1$ being the same as the coupling cycle of said terminal means of the same serial number; N adjustable impedances, for respectively simulating said various coefficients A, parallel connected between said N terminal means and said second circuit; and means for collecting a voltage from the other terminal circuit.

26. Electrical analog computing system for computing values of a function $y$ of at least one variable, say $y=F(X)$, within a predetermined interval of values of at least one of said variables, say X, only discrete values $y$ being known, by equating said function $y$ to the weighted sum $A_1f_1(X)+A_2f_2(X) \ldots A_Nf_N(X)$, said system comprising: a first and a second terminal circuit; means for feeding a voltage to one of said terminal circuits; an inverter device; a potentiometer having a circular winding, $n$ movable contacts, each shifted with respect to the adjacent one by $\pi/2n$, two terminals diametrically spaced from each other and connected to said first terminal circuit, directly and through said inverter device respectively, and two grounded terminals respectively spaced by $\pi/4$ from said terminals and extending over a sector corresponding to an opening angle $k\pi/n$, $k$ being of the order of 0.1, said potentiometer being symmetrically wound with respect to the diameter passing through said two grounded terminals, a rotary shaft carrying said movable contacts, the winding of the potentiometer being wound in accordance with the law expressed by $r(\theta)=r_0\varphi'(\theta)$, wherein $r(\theta)$ is the resistance of the winding portion comprised between one of said two grounded terminals and the point angularly spaced therefrom by an angle $\theta$, $\theta$ being equal to $$\frac{\pi}{2n}(X-1)$$

$r_0$ is half the resistance of said winding portion comprised between said two terminals, $\varphi'(\theta)$ is for $$1<X<n+1$$

equal to a function of (X) which is smoothed to the $(n-2)$th degree and varies from 0 to 0, when $\theta$ varies from zero to $\pi$, $n$ circuit means respectively coupled to said $n$ movable contacts and respectively numbered from one to $n$; switching means having $n$ terminal means respectively coupled to said $n$ circuits, two terminals respectively coupled to said two terminals, N other terminal means, forming $p$ groups of $n$ terminal means respectively numbered from one to $n$, with N, $n$ and $p$, being integers; and means, operable by said shaft, for coupling in succession each of said N other contacts to one of said two grounded terminals, to one of said $n$ terminal means of the same serial number, and to the other of said two grounded terminals, the variation cycle of $\theta$ between $\theta$ and $+\pi$ being the same as the coupling cycle of said terminal means of the same serial number to each other N adjustable impedances, for respectively simulating said various coefficients A, parallel connected between said N terminal means and said second cricuit; and means for collecting a voltage from the other terminal circuit.

27. Electrical analog computing system for computing values of a function $y$ of at least one variable, say $$y=F(X)$$

within a predetermined interval of values of at least one of said variables, say X, only discrete values of $y$ being known, by equating said function $y$ to the weighted sum $A_1f_1(X)+A_2f_2(X)\ .\ .\ .\ A_Nf_N(X)$, said system comprising: a first and a second terminal circuit; means for feeding a voltage to one of said terminal circuits; an inverter device; a potentiometer having a circular winding, $n$ movable contacts, each shifted with respect to the adjacent one by $\pi/n$, and two terminals spaced from each other by a distance slightly greater than the respective breadth of said contacts, extending over a sector corresponding to an opening angle $k\pi/n$, $k$ being of the order of 0.1, and connected to said first terminal circuit, directly and through said inverter device respectively; a rotating shaft carrying said movable contacts, the winding of the potentiometer being wound in accordance with the law expressed by $r(\theta)=r_0[1+\varphi(\theta)]$, wherein $r(\theta)$ is the resistance of the winding portion comprising between one of said two terminals and the point angularly spaced therefrom by an angle $\theta$, $\theta$ being equal to $$\frac{\pi}{n}(X-1)$$

$r_0$ is half the resistance of said winding comprised between said two terminals, $\varphi(\theta)$ is for $1<X<n+1$, equal to a function $h_n(X)$ which is smoothed to the $(n-1)$th degree and varies from $-1$ to $+1$, when $\theta$ varies from zero to $2\pi$; $n$ circuits means respectively coupled to said $n$ movable contacts and respectively numbered from one to $n$; switching means having $n$ terminal means respectively coupled to said $n$ circuits, two terminals respectively coupled to said two terminals, N other terminal means forming $p$ groups of $n$ terminal means respectively numbered from one to $n$, with N, $n$ and $p$ being integers, and means, operable by said shaft, for coupling in succession each of said N other contacts to one of said two terminals; to one of said $n$ terminal means of the same serial number, and to the other of said two terminals, the variation cycle of $\varphi(\theta)$ between $-1$ and $+1$ being the same as the coupling cycle of said terminal means of the same serial number to each other; N adjustable impedances, for respectively simulating said various coefficients A, parallel connected between said N terminal means and said second circuit; and means for collecting a voltage from the other terminal circuit.

28. Electrical analog computing system for computing values of a function $y$ of at least one variable, say $y=F(X)$, within a predetermined interval of values of at least one of said variables, say X, only discrete values of $y$ being known, by equating said function $y$ to the weighted sum $A_1f_1(X)+A_2f_2(X)\ .\ .\ .\ A_Nf_N(X)$, said system comprising: a first and a second terminal circuit; means for feeding a voltage to one of said terminal circuits; a potentiometer having a circular winding, $n$ movable contacts, each shifted with respect to the adjacent one by $\pi/n$ and two terminals diametrically spaced from each other, extending over a sector corresponding to an opening angle $k\pi/n$, $k$ being of the order of 0.1, and connected to said first terminal circuit, directly and through the ground respectively, said potentiometer being symmetrically wound with respect to the diameter passing through said two terminals; a rotary shaft carrying said movable contacts, the winding of the potentiometer being wound in accordance with the law expressed by $r(\theta)=r_0\varphi'(\theta)$, wherein $r(\theta)$ is the resistance of the winding portion comprised between one of said two terminals and the point angularly spaced therefrom by an angle $\theta$, $\theta$ being equal to $$\frac{\pi}{n}(X-1),\ r_0$$

is half the resistance of said winding portion comprised between said two terminals, $\varphi'(\theta)$ is for $1<X<n+1$ equal to a function of X which is smoothed to the $(n-2)$th degree and varies from $-0$ to $+0$, when $\theta$ varies from zero to $2\pi$; $n$ circuit means respectively coupled to said $n$ movable contacts and respectively numbered from one to $n$; switching means having $n$ terminal means respectively coupled to said $n$ circuits, two terminals respectively coupled to said two terminals, N other terminal means forming $p$ groups of $n$ terminal means respectively numbered from one to $n$, with, N, $n$ and $p$ being integers, and means, operable by said shaft, for coupling in succession each of said N other contacts to said grounded terminal, to one of said $n$ terminal means of the same serial number, and to said grounded terminal, the variation cycle of $\theta$ between 0 and $2\pi$ being the same as the coupling cycle of said terminal means of the same serial number to each other; N adjustable impedances, for respectively simulating said various coefficients A, parallel connected between said N terminal means and said second circuit; and means for collecting a voltage from the other terminal circuit.

29. A system according to claim 26 in which said function $\varphi'(\theta)$ is equal to a function $$\frac{dh_n}{dX}(X)\ \text{for}\ 1<X<n+1$$

the function $h_n$ (X) being equal to $-1$ for $X=1$, varying from $-1$ to $+1$ for $1<X<n+1$ and being equal to 1 for $X=n+1$, said function $h_n$ (X) being smoothed to the $(n-1)$th degree.

30. A system according to claim 28, in which the function $\varphi'(\theta)$ is equal to a function $$\frac{dh_n}{dX}(X)\ \text{for}\ 1<X<n+1$$

said function $h_n$ (X) being equal to $-1$ for $X=1$, varying from $-1$ to $+1$ for $1<X<n+1$, and being equal to 1 for $X=n+1$, said function $h_n$ (X) being smoothed to the $(n-1)$th degree.

31. Electrical analog computing system for computing values of a function $y$ of at least one variable, say $y=F(X)$, within a predetermined interval of values of at least one of said variabies, say X, only discrete values of $y$ being known, by equating function $y$ to the weighted sum $A_1f_1(X)+A_2f_2(X)\ .\ .\ .\ A_Nf_N(X)$, said system comprising: a first and a second terminal circuit; means for feeding a voltage to one of said terminal circuits; a synchrodetector having a stator with $n$ windings, respectively numbered from 1 to $n$, shifted by $\pi/2n$ with respect to each other, and a rotor having one winding, rotatable around the axis of said stator, and two terminals coupled to said first terminal circuit; $n$ terminal circuits respectively coupled to said $n$ windings; a shaft for rotating said rotor, the angular position $\theta$ of said shaft being equal to $$\theta=\frac{\pi}{2n}(X-1)$$

switching means having $n$ terminal means respectively coupled to said $n$ terminal circuits, two contacts respectively coupled to said two terminals of said rotor, and N other terminal means, forming $p$ groups of $n$ terminal means respectively numbered from one to $n$, with N, $n$ and $p$ being integers, and means, operable by said shaft with a periodicity cycle corresponding to an increase of X by $n$, for coupling in succession each of said N contacts to one of said two terminals, to that of said $n$ terminal means which has the same serial number, and to the other of said two terminals; N adjustable impedances, for respectively simulating said various coefficient $A_1$ to $A_n$, parallel connected between said N terminal means and said second terminal circuit; and means for collecting a voltage from said other terminal circuit.

32. Electrical analog computing system for computing values of a function $y$ of at least one variable, say $y=F(X)$, within a predetermined interval of values of at least one of said variables, say X, only discrete values of $y$ being known, by equating said function $y$ to the weighted sum $A_1f_1(X)+A_2f_2(X)\ \ldots\ A_Nf_N(X)$, said system comprising: a first and a second terminal circuit: means for feeding a voltage to said first terminal circuit; a variator circuit comprising two terminal means coupled to said first terminal circuit, $n$ other terminal means and variable parameter circuit means respectively numbered from one to $n$ coupling said two terminal means and said $n$ terminal means respectively, said parameters being periodically variable with respect to X between two parameter values constant with respect to X, with a phase shift with respect to each other constant with respect to X; two circuits coupled to said first terminal circuit and having respectively said parameter values; switching means having $n$ terminal means, respectively coupled to said $n$ variator terminal means, two terminal means respectively coupled to said two circuits and N other terminal means, forming $p$ groups of $n$ terminal means respectively numbered from one to $n$, with N, $n$ and $p$ being integers, and means for coupling in succession each of said N terminal means to one of said two circuits, to that one of said $n$ terminal means which has the same serial number and to the other of said two circuits, the variation cycle as a function of X of said parameters between their respective minimum and maximum values being the same as the coupling cycle of said terminal means of the same serial number to each other; N circuits, having parameters for respectively simulating said various coefficients A, parallel connected between said N terminal means and said second circuit; and means for collecting a voltage from said second terminal circuit.

33. Electrical analog computing system for computing values of a function $y$ of at least one variable, say $y=F(X)$, within a predetermined interval of values at least one of said variables, say X, only discrete values of $y$ being known by equating said function $y$ to the weighted sum $A_1f_1(X)+A_2f_2(X)+\ \ldots\ A_Nf_N(X)$, said system comprising: a first and a second terminal circuit: means for feeding a voltage to said second terminal circuit; a variator circuit comprising two terminal means coupled to said first terminal circuit, $n$ other terminal means and variable parameter circuit means respectively numbered from one to $n$ coupling said two terminal means and said $n$ terminal means respectively, said parameters being periodically variable with respect to X between two parameter values constant with respect to X with a phase shift with respect to each other constant with respect to X, two circuits coupled to said first terminal circuit and having respectively said parameter values; switching means having $n$ terminal means, respectively coupled to said $n$ variator terminal means, two terminal means respectively coupled to said two circuits, and N other terminal means, forming $p$ groups of $n$ terminal means respectively numbered from one to $n$, with N, $n$ and $p$ being integers, and means for coupling in succession each of said N terminal means to one of said two circuits, to that one of said $n$ terminal means which has the same serial number and to the other of said two circuits, the variation cycle as a function of X of said parameters between their respective minimum and maximum values being the same as the coupling cycle of said terminal means of the same serial number to each other; N circuits, having parameters for respectively simulating said various coefficients A, parallel connected between said N terminal means and said second circuit; and means for collecting a voltage from said first terminal circuit.

34. Electrical analog computing system for computing values of a function $y$ of at least one variable, say $y=F(X)$, within a predetermined interval of values of at least one of said variables, say X, only discrete values of $y$ being known, by equating said funtion $y$ to the weighted sum $A_1f_1(X)+A_2f_2(X)+\ \ldots\ A_Nf_N(X)$, said system comprising: $n$ first multiplier networks respectively numbered from one to $n$, each comprising one quadripole having variable reactance means and two input terminals and one quadripole having fixed reactance means and two output terminals, said quadripoles being series connected, said input terminals being common to said quadripoles; said variable reactance means pertaining to the variable quadripole of serial number one varying as a function $h_n(X)$ with a period equal to $2n$ from a first fixed value $a$ for $X=1$ to a second fixed value $b$ for $X=2n+1$ and to $a$ for $X=2n+1$, and being smoothed to at least the $(n-1)$th degree, and the respective variable reactance functions of the quadripoles of serial number 2 to $n$ being respectively shifted from $h_n(X)$ by $X=1\ \ldots\ X=n$; means for feeding an input voltage to said input terminals; a second multiplier network of the above mentioned type comprising N quadripoles having variable reactance means, forming $p$ groups of $n$ quadripoles respectively numbered from one to $n$ having respectively two input terminals, and one output quadripole, series connected to said N variable reactance quadripoles respectively and having two output terminals, said variable reactance means of said N quadripoles being adjusted for respectively simulating said coefficients A; switching means for coupling in succession each of said two input terminals of said N variable reactance quadripoles, to one of said common input terminals, to one of the output terminals of that one of said fixed reactance quadripoles which has the same serial number and to the other common input terminal, the coupling cycle of said switching means the periodicity $X=n$; and means for collecting an output voltage across said output terminals of said output quadripole.

35. Electrical analog computing system for computing values of a function $y$ of at least one variable, say $y=F(X)$, within a predetermined interval of values of at least one of said variables, say X, only discrete values of $y$ being known, by equating said function $y$ to the weighted sum $A_1f_1(X)+A_2f_2(X)+\ \ldots\ A_Nf_N(X)$, said system comprising: $n$ first multiplier networks respectively numbered from one to $n$, each comprising one quadripole having variable reactance means and two input terminals and one quadripole having fixed reactance means and two output terminals, said quadripoles being series connected, said input terminals being common to said quadripoles; said variable reactance means, pertaining to the variable quadripole of serial number one varying as a function $$g(X)=\frac{dh_n}{dX}(X)$$

$g(X)$ varying from zero for $X=1$ to zero for $X=n+1$ and to zero for $X=2n+1$, and being smoothed to at least the $(n-2)$th degree, and the respective variable reactance functions of the quadripoles of serial number 2 to $n$ being shifted from $g(X)$ by $X=1 \ldots X=n$ respectively; means for feeding an input voltage to said input terminals; a second multiplier network of the above mentioned type comprising N quadripoles, having variable reactance means and forming $p$ groups of $n$ quadripoles respectively numbered from one to $n$, having respectively two input terminals, and one output quadripole series connected to said N variable reactance quadripoles respectively and having two output terminals, said variable reactance means of said N quadripoles being adjusted for respectively simulating said coefficients A; switching means for coupling in succession each of said two input terminals of said N variable quadripoles to the ground, to one of the output terminals of that one of said fixed reactance quadripoles which has the same serial number and to the ground, the coupling cycle of said switching means having the periodicity $X=n$; and means for collecting an output voltage across said two output terminals of said output quadripole.

36. Electrical analog computing system for computing a function $y$ of at least one variable, say $y=F(X)$, within a predetermined interval of values of at least one of said variables, say X, only discrete values of $y$ being known, by equating said function $y$ to the weighted sum $$A_1f_1(X)+A_2f_2(X)+ \ldots A_Nf_N(X)$$

said system comprising: a first multiplicator network comprising N first quadripoles having variable reactance means, forming $p$ groups of $n$ quadripoles respectively numbered from one to $n$, and having two common input terminals, and two output terminals respectively, said variable reactance means of said first quadripoles being respectively adjusted for simulating said coefficients A, and $n$ second quadripoles of rank one to $n$, having fixed reactance means, two input and two output terminals respectively; means for feeding a voltage to said two common input terminals; a rotating shaft, the angular position of which is defined by X, a turn of said shaft corresponding to an increase of X by $2n$; a second multiplicator network comprising said N first quadripoles and one output quadripole having fixed reactance means and two input and two output terminals; means operable by said shaft for coupling in succession each of said output terminals of said N first quadripoles to one of the input terminals of said output quadripole, to one of said input terminals of that one of said $n$ second quadripoles which has the same serial number, and to the other input terminal of said output quadripole, the periodicity cycle of said switching operation being $X=n$; a third multiplicator network comprising $n$ third quadripoles respectively numbered from one to $n$, having respectively variable reactance means and two inputs, respectively connected to the output terminals of the second quadripole of the same serial number, and two common outputs, and said output quadripole, said variable reactance means of said third quadripole of serial number one being periodically variable in the interval $1<X<2n+1$, with a period $2n$, as a function $h_n(X)$, said function being equal to a fixed value $a$ for $X=1$, to a fixed value $b$ for $X=n+1$, to $a$ for $X=2n+1$, said function being smoothed at least to the $(n-1)$th degree and the respective variable reactance functions pertaining to said third quadripoles of serial number 2 to $n$ being respectively shifted by $X=1$ to $X=n$ with respect to said function $h_n(X)$; and means for collecting an output voltage across said output terminals of said output quadripole.

37. Electrical analog computing system for computing a function $y$ of at least one variable, say $y=F(X)$, within a predetermined interval of values of at least one of said variables, say X, only discrete values of $y$ being known, by equating said function $y$ to the weighted sum $$A_1f_1(X)+A_2f_2(X)+ \ldots A_Nf_N(X)$$

said system comprising: a first multiplicator network comprising N first quadripoles having variable reactance means, forming $p$ groups of $n$ quadripoles respectively numbered from one to $n$, having two common input terminals and two output terminals respectively, said variable reactance means of said first quadripoles being respectively adjusted for simulating said coefficients A, and $n$ second quadripoles respectively numbered from one to $n$, having fixed reactance means, two input and two output terminals respectively; means for feeding a voltage to said two common input terminals; a rotating shaft, the angular position of which is defined by X, a turn of said shaft corresponding to an increase of X by $2n$; one output quadripole having fixed reactance means, two input and two output terminals; means operable by said shaft for coupling in succession each of said output terminals of said N quadripoles to the ground, to one of said input terminals of that one of said $n$ second quadripoles which has the same serial number, and to the ground, the periodicity cycle of said switching operation being $X=a$; a second multiplicator network comprising $n$ third quadripoles respectively numbered one to $n$ having respectively variable reactance means and two inputs, respectively connected to the output terminals of said $n$ second quadripoles of the same serial number and two common outputs of said output quadripole, said variable reactance means of said third quadripole of serial number one being periodically variable with a period $2n$ as a function $$g(X)=\frac{dh_n}{dX}(X)$$

in the interval $1<X<2n+1$, equal to zero for $X=1$, $n+1$, $2n+1$ said function being smoothed at least to the $(n-2)$th degree and the respective variable reactance functions of said third quadripoles of rank 2 to $n$ being respectively shifted by $X=1$ to $X=n$ with respect to said function $g(X)$; and means for collecting an output voltage across said output terminals of said output quadripole.

38. Electrical analog computing system for computing values of a function $z$ of two variables, say $z=F(XY)$, within a predetermined interval of values of said two variables, only discrete values of $a$ being known, by equating said function $z$ to the weighted sum $$\sum_{q=1,\ q=N'}^{p=1,\ p=N} A_{pq}fp(X)\cdot g_q(Y)$$

said system comprising: a first and a second terminal circuit; means for feeding a voltage to said first terminal circuit; a first variator circuit comprising two terminal means coupled to said first terminal circuit, $n$ other terminal means and variable parameter circuit means respectively numbered from one to $n$ coupling said two terminal means and said $n$ terminal means respectively, said parameters being periodically variable with respect to X between two parameter values constant with respect to X with a phase shift with respect to each other constant with respect to X; two circuits coupled to said first terminal circuit and having respectively said parameter values; switching means having $n$ terminal means respectively coupled to said $n$ variator terminal means, two terminal means respectively coupled to said two circuits, and N other terminal means, forming $p$ groups of $n$ terminal means respectively numbered from one to $n$, with N, $n$ and $p$ being integers, and means for coupling in succession each of said N terminal means to one of said two circuits, to that one of said $n$ terminal means which has the same serial number and to the other of said two circuits, the variation cycle as a function of X of said parameters between their respective minimum and maximum values being the same as the coupling cycle of said terminal means of the same serial number to each other; N circuits respectively connected to said N terminal means, said N circuits comprising each N' parallel connected circuits, said circuits having respective parameters for respectively simulating said coefficients $Apq$ respectively connected to said N terminal means, one of said N′ circuits of each of said N circuits being coupled in parallel with one circuit of the other $N-1$ circuits, thus building up N′ further circuits; a second variator circuit comprising two terminal means coupled to said second terminal circuit, $n'$ other terminal means and variable parameter circuit means respectively numbered from one to $n'$ coupling said two terminal means and said $n'$ terminal means respectively, said parameters being periodically variable with respect to Y between two parameter values constant with respect to Y with a phase shift with respect to each other constant with respect to Y; two circuits coupled to said second terminal circuit and having respectively said parameter values; switching means having $n'$ terminal means, respectively coupled to said $n'$ terminal means, two terminal means respectively coupled to said two circuits, and N′ other terminal means, forming $q$ groups of $n'$ terminal means respectively numbered from one to $n$, with N′, $n'$ and $q$ being integers, and means, for coupling in succession each of said N′ terminal means to one of said two circuits, to that one of said N′ terminal means which has the same serial number and to the other of said two circuits, the variation cycle as a function of Y of said parameters between their respective minimum and its maximum values being the same as the coupling cycle of said terminal means of the same serial number to each other; said N′ circuits being parallel connected to said N′ terminal means; and means for collecting a voltage from said second circuit.

References Cited in the file of this patent

FOREIGN PATENTS 889,976 France ---------------- Oct. 25, 1943

OTHER REFERENCES

Journal of the Franklin Institute (Tomovich), August 1952, pages 143–151.

Journal of the Franklin Institute (Tomovich), February 1954, pages 109–120.